US009596738B2

United States Patent
Catalano et al.

(10) Patent No.: US 9,596,738 B2
(45) Date of Patent: Mar. 14, 2017

(54) COMMUNICATION WITH LIGHTING UNITS OVER A POWER BUS

(71) Applicant: TerraLUX, Inc., Longmont, CO (US)

(72) Inventors: Anthony W. Catalano, Lafayette, CO (US); John A. Koski, Lafayette, CO (US); Brett James Pardikes, Frederick, CO (US); Brian Eldin Brandt, Longmont, CO (US)

(73) Assignee: TerraLUX, Inc., Longmont, CO (US)

( * ) Notice: Subject to any disclaimer, the term of this patent is extended or adjusted under 35 U.S.C. 154(b) by 244 days.

(21) Appl. No.: 14/277,859

(22) Filed: May 15, 2014

(65) Prior Publication Data

US 2014/0246993 A1    Sep. 4, 2014

Related U.S. Application Data

(63) Continuation-in-part of application No. 13/234,343, filed on Sep. 16, 2011, now Pat. No. 9,342,058.

(60) Provisional application No. 61/383,506, filed on Sep. 16, 2010, provisional application No. 61/383,517, filed on Sep. 16, 2010.

(51) Int. Cl.
*H05B 37/02* (2006.01)
*H05B 33/08* (2006.01)

(52) U.S. Cl.
CPC ..... *H05B 37/0263* (2013.01); *H05B 33/0872* (2013.01); *H05B 37/02* (2013.01); *H05B 37/0218* (2013.01); *H05B 37/0227* (2013.01); *H05B 37/0245* (2013.01)

(58) Field of Classification Search
CPC ............... H05B 37/02; H05B 33/0872; H05B 37/0218; H05B 37/0227; H05B 37/0245; H05B 37/0263

USPC ................. 315/291, 292, 307, 312, 317, 318
See application file for complete search history.

(56) References Cited

U.S. PATENT DOCUMENTS

| | | | |
|---|---|---|---|
| 4,085,403 A | 4/1978 | Meier et al. |
| 4,529,949 A | 7/1985 | De et al. |
| 4,633,161 A | 12/1986 | Callahan et al. |
| 5,291,607 A | 3/1994 | Ristic et al. |
| 5,401,099 A | 3/1995 | Nishizawa et al. |
| 5,485,579 A | 1/1996 | Hitz et al. |
| 5,506,490 A | 4/1996 | Demuro |
| 5,546,041 A | 8/1996 | Szajda |
| 5,691,691 A | 11/1997 | Merwin et al. |
| 5,783,909 A | 7/1998 | Hochstein |

(Continued)

FOREIGN PATENT DOCUMENTS

| | | |
|---|---|---|
| AU | 2011301977 A1 | 3/2013 |
| CN | 2924996 Y | 7/2007 |

(Continued)

OTHER PUBLICATIONS

Linder, Nora, "International Preliminary Report on Patentability re Application No. PCT/US2011/051883", Mar. 19, 2013, Published in: PCT.

(Continued)

*Primary Examiner* — Tung X Le
(74) *Attorney, Agent, or Firm* — Neugeboren O'Dowd PC

(57) ABSTRACT

Various systems and methods facilitate internal communication within a lighting module as well as intercommunication among lighting modules over an external network. The network may be a conventional network managed by a central network controller or may be an ad hoc or "mesh" network—i.e., a scalable network architecture in which any lighting module is a node that can communicate with any other module or network-connected device.

29 Claims, 12 Drawing Sheets

(56) References Cited

U.S. PATENT DOCUMENTS

| | | |
|---|---|---|
| 5,925,990 A | 7/1999 | Crouse et al. |
| 6,097,761 A | 8/2000 | Buhring et al. |
| 6,153,985 A | 11/2000 | Grossman |
| 6,332,710 B1 | 12/2001 | Aslan et al. |
| 6,351,079 B1 | 2/2002 | Willis |
| 6,382,812 B1 | 5/2002 | Hsu |
| 6,693,394 B1 | 2/2004 | Guo et al. |
| 6,713,974 B2 | 3/2004 | Patchornik et al. |
| 6,762,629 B2 | 7/2004 | Tam et al. |
| 6,842,668 B2 | 1/2005 | Carson et al. |
| 6,870,325 B2 | 3/2005 | Bushell et al. |
| 6,930,737 B2 | 8/2005 | Weindorf et al. |
| 7,029,145 B2 | 4/2006 | Frederick |
| 7,034,507 B2 | 4/2006 | Lovett |
| 7,049,765 B1 | 5/2006 | Tremaine, Sr. |
| 7,119,498 B2 | 10/2006 | Baldwin et al. |
| 7,126,290 B2 | 10/2006 | Elliott |
| 7,150,561 B1 | 12/2006 | D'Aquino et al. |
| 7,196,481 B2 | 3/2007 | Bushell et al. |
| 7,204,638 B2 | 4/2007 | Hsu |
| 7,233,258 B1 | 6/2007 | Gelinas |
| 7,242,150 B2 | 7/2007 | DeJonge et al. |
| 7,245,089 B2 | 7/2007 | Yang |
| 7,245,090 B2 | 7/2007 | Yang |
| 7,262,559 B2 | 8/2007 | Tripathi et al. |
| 7,286,123 B2 | 10/2007 | Yang |
| 7,322,718 B2 | 1/2008 | Setomoto et al. |
| 7,330,002 B2 | 2/2008 | Joung |
| 7,358,679 B2 | 4/2008 | Lys et al. |
| 7,423,750 B2 | 9/2008 | Hoshizaki et al. |
| 7,429,129 B2 | 9/2008 | St. Pierre et al. |
| 7,492,108 B2 | 2/2009 | Garcia et al. |
| 7,504,783 B2 | 3/2009 | Zarr |
| 7,507,001 B2 | 3/2009 | Kit |
| 7,546,473 B2 | 6/2009 | Newman |
| 7,556,423 B2 | 7/2009 | Caliboso |
| 7,626,346 B2 | 12/2009 | Scilla |
| 7,628,507 B2 | 12/2009 | Allen et al. |
| 7,633,326 B2 | 12/2009 | Okajima |
| 7,635,957 B2 | 12/2009 | Tripathi et al. |
| 7,656,307 B2 | 2/2010 | Yatsuda et al. |
| 7,656,371 B2 | 2/2010 | Shimizu et al. |
| 7,728,401 B2 | 6/2010 | Takatori |
| 7,755,513 B2 | 7/2010 | Wang et al. |
| 7,777,430 B2 | 8/2010 | Catalano et al. |
| 7,791,326 B2 | 9/2010 | Dahlman et al. |
| 7,792,167 B2 | 9/2010 | Kanesaka |
| 7,800,316 B2 | 9/2010 | Haug |
| 7,800,567 B2 | 9/2010 | Fujino |
| 7,812,551 B2 | 10/2010 | Hite et al. |
| 7,817,009 B2 | 10/2010 | Wang et al. |
| 7,888,877 B2 | 2/2011 | Tsai et al. |
| 7,892,870 B2 | 2/2011 | Shi |
| 7,911,156 B2 | 3/2011 | Cottongim et al. |
| 7,911,438 B2 | 3/2011 | Okazaki |
| 7,947,947 B2 | 5/2011 | Ackermann et al. |
| 7,948,190 B2 | 5/2011 | Grajcar |
| 7,948,398 B2 | 5/2011 | Miller |
| 7,986,112 B2 | 7/2011 | West |
| 7,990,077 B2 | 8/2011 | Yu et al. |
| 7,994,725 B2 | 8/2011 | Bouchard |
| 8,922,570 B2 * | 12/2014 | Archer ............... H05B 37/0245 345/204 |
| 8,954,170 B2 * | 2/2015 | Chemel ............... H05B 37/029 315/297 |
| 2002/0048177 A1 | 4/2002 | Rahm et al. |
| 2003/0123521 A1 | 7/2003 | Luoma |
| 2004/0164688 A1 | 8/2004 | Van Tichelen et al. |
| 2005/0057184 A1 | 3/2005 | Kaneko et al. |
| 2005/0174473 A1 * | 8/2005 | Morgan ............... F21S 48/325 348/370 |
| 2006/0038661 A1 | 2/2006 | Reinhold et al. |
| 2006/0119288 A1 | 6/2006 | Ayala et al. |
| 2006/0125773 A1 | 6/2006 | Ichikawa et al. |
| 2006/0214876 A1 | 9/2006 | Jendbro et al. |
| 2006/0237636 A1 | 10/2006 | Lyons et al. |
| 2006/0238169 A1 | 10/2006 | Baker |
| 2007/0040518 A1 | 2/2007 | Young |
| 2007/0057902 A1 | 3/2007 | Joung |
| 2007/0121324 A1 | 5/2007 | Nakano |
| 2007/0291483 A1 | 12/2007 | Lys |
| 2008/0018261 A1 | 1/2008 | Kastner |
| 2008/0062070 A1 | 3/2008 | De Oto et al. |
| 2008/0088557 A1 | 4/2008 | Choi |
| 2008/0111505 A1 | 5/2008 | Wang et al. |
| 2008/0151965 A1 | 6/2008 | Kim |
| 2008/0198613 A1 | 8/2008 | Cruickshank |
| 2008/0204884 A1 | 8/2008 | Jang |
| 2008/0231198 A1 | 9/2008 | Zarr |
| 2008/0238340 A1 | 10/2008 | Leung et al. |
| 2008/0258636 A1 | 10/2008 | Shih et al. |
| 2008/0287742 A1 | 11/2008 | St. George et al. |
| 2008/0319690 A1 | 12/2008 | Meadows et al. |
| 2009/0021178 A1 | 1/2009 | Furukawa et al. |
| 2009/0021955 A1 | 1/2009 | Kuang et al. |
| 2009/0097244 A1 | 4/2009 | Lan et al. |
| 2009/0146584 A1 | 6/2009 | Ye et al. |
| 2009/0154525 A1 | 6/2009 | Dai et al. |
| 2009/0167203 A1 | 7/2009 | Dahlman et al. |
| 2009/0179574 A1 | 7/2009 | Chang |
| 2009/0179848 A1 | 7/2009 | Schmidt et al. |
| 2009/0212736 A1 | 8/2009 | Baarman et al. |
| 2009/0251059 A1 | 10/2009 | Veltman |
| 2009/0267523 A1 | 10/2009 | Phillips |
| 2009/0289965 A1 | 11/2009 | Kurokawa et al. |
| 2009/0302783 A1 | 12/2009 | Wang et al. |
| 2009/0306912 A1 | 12/2009 | Chen et al. |
| 2010/0007588 A1 | 1/2010 | Zygmunt et al. |
| 2010/0033095 A1 | 2/2010 | Sadwick |
| 2010/0033112 A1 | 2/2010 | Yen |
| 2010/0039049 A1 | 2/2010 | Hoffman |
| 2010/0066270 A1 | 3/2010 | Yang et al. |
| 2010/0118057 A1 | 5/2010 | Atkins et al. |
| 2010/0134020 A1 | 6/2010 | Peng et al. |
| 2010/0157583 A1 | 6/2010 | Nakajima |
| 2010/0176746 A1 | 7/2010 | Catalano et al. |
| 2010/0194368 A1 | 8/2010 | Taylor et al. |
| 2010/0203465 A1 | 8/2010 | Bria et al. |
| 2010/0244701 A1 | 9/2010 | Chen et al. |
| 2010/0259191 A1 | 10/2010 | Ghanem et al. |
| 2010/0264795 A1 | 10/2010 | Miao |
| 2010/0277077 A1 | 11/2010 | Pong et al. |
| 2010/0295474 A1 | 11/2010 | Chemel et al. |
| 2010/0295688 A1 | 11/2010 | Wu et al. |
| 2010/0320939 A1 | 12/2010 | Lai |
| 2011/0001438 A1 | 1/2011 | Chemel et al. |
| 2011/0019430 A1 | 1/2011 | Wilkinson et al. |
| 2011/0031903 A1 | 2/2011 | Nguyen Hoang et al. |
| 2011/0038715 A1 | 2/2011 | Frank et al. |
| 2011/0043120 A1 | 2/2011 | Panagotacos et al. |
| 2011/0062895 A1 | 3/2011 | Ji |
| 2011/0080099 A1 | 4/2011 | Teng et al. |
| 2011/0089852 A1 | 4/2011 | Segan |
| 2011/0109231 A1 | 5/2011 | Shiu et al. |
| 2011/0115396 A1 | 5/2011 | Horvath et al. |
| 2011/0115400 A1 | 5/2011 | Harrison et al. |
| 2011/0115645 A1 | 5/2011 | Hall et al. |
| 2011/0121751 A1 | 5/2011 | Harrison et al. |
| 2011/0121760 A1 | 5/2011 | Harrison et al. |
| 2011/0147466 A1 | 6/2011 | Kang et al. |
| 2011/0150028 A1 | 6/2011 | Nguyen Hoang et al. |
| 2011/0156593 A1 | 6/2011 | De Greef et al. |
| 2011/0157238 A1 | 6/2011 | Lin et al. |
| 2011/0163696 A1 | 7/2011 | Huang et al. |
| 2011/0199013 A1 | 8/2011 | Cottrell |
| 2012/0068618 A1 | 3/2012 | Koski et al. |
| 2014/0246933 A1 | 9/2014 | Chamberlin |

FOREIGN PATENT DOCUMENTS

| | | |
|---|---|---|
| CN | 101511143 A | 8/2009 |
| CN | 103098552 A | 5/2013 |
| DE | 19725710 A1 | 1/1998 |
| DE | 19725710 B4 | 5/2006 |

(56) References Cited

FOREIGN PATENT DOCUMENTS

| | | |
|---|---|---|
| EP | 492117 A2 | 7/1992 |
| EP | 657697 A1 | 6/1995 |
| EP | 923274 A2 | 6/1999 |
| EP | 1271799 A1 | 1/2003 |
| EP | 1313353 A1 | 5/2003 |
| EP | 1701589 A1 | 9/2006 |
| EP | 2073607 A1 | 6/2009 |
| EP | 2273851 A2 | 1/2011 |
| EP | 2617266 A1 | 7/2013 |
| GB | 2335334 A | 9/1999 |
| JP | 57-133685 U | 8/1982 |
| JP | 2003-188415 A | 7/2003 |
| JP | 2003-317979 A | 11/2003 |
| JP | 2009-83590 A | 4/2009 |
| JP | 2013543216 A | 11/2013 |
| KR | 10-2000-0006665 A | 2/2000 |
| KR | 10-2006-0098345 A | 9/2006 |
| KR | 10-2007-0053818 A | 5/2007 |
| WO | 90/10238 A2 | 9/1990 |
| WO | 99/00650 A1 | 1/1999 |
| WO | 99/48340 A1 | 9/1999 |
| WO | 00/17728 A2 | 3/2000 |
| WO | 2005/081591 A1 | 9/2005 |
| WO | 2006/058418 A1 | 6/2006 |
| WO | 2009/055821 A1 | 4/2009 |
| WO | 2009/079944 A1 | 7/2009 |
| WO | 2011/044040 A1 | 4/2011 |
| WO | 2011/056242 A1 | 5/2011 |
| WO | 2012037436 A1 | 3/2012 |

OTHER PUBLICATIONS

Ladiray, Olivier, "International Search Report and Written Opinion re Application No. PCT/US2011/051883", Jun. 2, 2012, Published in: PCT.

Xiaoli, Liao, "Office Action re Patent Application 201180044078.8", Aug. 12, 2015, p. 8 Published in: CN.

European Patent Office, "Office Action re Patent Application 11781896.3", Jan. 5, 2015, Published in: EP.

European Patent Office, "Office Action re Patent Application 11781896.3", Apr. 29, 2013, Published in: EP.

Somervell, Thomas, "Response to Office Action re Patent Application 11781896.3", Oct. 29, 2013, Published in: EP.

Xialoi, Liao, "Chinese Office Action re Application No. 201180044078.8", Feb. 27, 2015, p. 8, Published in: CN.

Xialoi, Liao, "Chinese Office Action re Application No. 201180044078.8", Aug. 12, 2015, p. 10, Published in: CN.

European Patent Office, "European Search Report re Application No. 117818963", Jan. 4, 2016, p. 4, Published in: EP.

Lotter, David, "US Office Action re Application No. 13234343", May 1, 2015, p. 26, Published in: US.

Lotter, David, "US Office Action re Application No. 13234343", Aug. 22, 2013, p. 29, Published in: US.

Currie, Matthew T., "Response to US Office Action re Application No. 13234343", Aug. 14, 2015, p. 16, Published in: US.

Lin, Ya-Chia, "Response to US Office Action re Application No. 13234343", Nov. 21, 2013, p. 13, Published in:US.

PCT International Application No. PCT/US2010/020819, International Preliminary Report on Patentability mailed on Jul. 28, 2011, 7 pages.

PCT International Application No. PCT/US2010/020819, International Search Report and Written Opinion mailed on Aug. 13, 2010, 8 pages.

PCT International Application No. PCT/US2011/051883, International Search Report and Written Opinion mailed on Feb. 6, 2012, 11 pages.

Examination Report in Australian Patent Application No. 2011301977, mailed on Jan. 30, 2014, 3 pages.

Examination Report in Chinese Patent Application No. 201180044078.8, mailed on Mar. 19, 2014, 10 pages of Official Copy.

* cited by examiner

COMMUNICATION WITH LIGHTING UNITS OVER A POWER BUS

CROSS-REFERENCE TO RELATED APPLICATION

This is a continuation-in-part of U.S. Ser. No. 13,234,343, filed on Sep. 16, 2011 (the "'343 application"), which claims priority to U.S. Ser. Nos. 61,383,506 and 61/383,517 (both filed on Sep. 16, 2010). The entire disclosures of these priority documents are hereby incorporated by reference.

TECHNICAL FIELD

Embodiments of the invention generally relate to modular lighting systems organized over a network.

BACKGROUND

A lighting system that includes a plurality of light sources may locate circuitry common to all of the light sources, such as a power supply, in a central controller rather than including redundant copies of the circuitry at each light source. A central power supply, for example, may reduce the cost of the lighting system, due to the fewer total components used, as well as reduce the power consumed by the system, allow for smaller and cooler light sources, and provide a more convenient point of access for maintenance or repair. Such a system may distribute a power bus from the central controller to the plurality of light sources, which may be widely distributed across a room, building, or other area.

In addition to distributing power, the central controller may change the brightness, color, or other such property of one or more of the light sources from a single, easily accessible location. Status information, such as temperature, may be sent from the light sources to the central controller, which may automatically adjust a property of the light sources in response to the information or may present the information to a user. The commands to the lights and the information read from the lights, may be sent and received using one or more buses routed, in addition to the power bus, between the central controller and the light sources. More buses may, however, mean more cost added to the system and more difficulty in installing and maintaining the system. Therefore, in some systems, the power bus is also used as a command bus.

Such configurations enable local detection of anomalies, i.e., deviations from proper operating conditions that occur within a lighting module. If the problem can also be corrected locally, e.g., by adjusting the current to a light source or, in some cases, by disabling the light source entirely, then no external measures will be necessary. That is not always possible, of course; correction of a malfunction may require measures beyond the capability of internal circuitry, and indeed, the circuitry handling internal communications may itself be affected by the malfunction.

Accordingly, there is a need for systems and methods that facilitate internal communication within a lighting module to detect and, where possible, correct anomalies as well as externally communicating state information of the lighting module externally to other devices where appropriate.

SUMMARY

Various aspects of the systems and methods described herein facilitate internal communication within a lighting module as well as intercommunication among lighting modules over an external network. The network may be a conventional network managed by a central network controller (not to be confused with the central controller responsible for an individual lighting module) or may be an ad hoc or "mesh" network—i.e., a scalable network architecture in which any lighting module is a node that can communicate with any other module or network-connected device (such as an interface node that permits an operator to query individual or multiple lighting modules), either directly or through intermediate notes.

In an ad hoc network, when a new sensor is added to the system, it is recognized by every other device and by a network controller (if the system includes one), and the network is effectively expanded merely as a result of this recognition; the new device can communicate with every other device, e.g., via a network controller. Similarly, loss of a device—due either to malfunction or deliberate removal from the network—does not affect overall network operation; when the network controller recognizes that a device is no longer present, it simply deletes that device from the routing table.

In some mesh network topologies, the network controller is eliminated by designating one of the sensors as a "master" and the rest as "slaves." The master device typically has system-wide supervisory responsibilities that are more efficiently handled by a single node than on a distributed basis, i.e., by all nodes. A master device may be specially configured or simply a designated one of many identical devices, any of which is equipped to act as master if triggered to do so.

Accordingly, in a first aspect, the invention pertains to a lighting apparatus configured for internal communication over an internal network and communication with other lighting modules over an external network. In various embodiments, the apparatus comprises a power supply; a controller; at least one light source; an internal network facilitating bidirectional communication between the controller and the light source(s); and a transceiver for communicating over the external network. The controller may be configured to (i) communicate over the internal network with the at least one light source to obtain state information therefrom and (ii) communicate the state information over the external network using the using the transceiver. In some embodiments, the apparatus comprises a plurality of light sources and the controller is configured to selectively communicate with any of the light sources over the internal network to obtain state information therefrom. The internal network may comprise a power bus for both powering the light source(s) and facilitating communication between the controller and the light source(s). In such cases, the internal network may contain an impedance-switching circuit for selecting between a low power-supply output impedance and a high power-supply output impedance, in which case the light source(s) and the controller may communicate over the power bus using the impedance-switching circuit to send messages to each other.

In some embodiments, the apparatus comprises a plurality of light sources, and the controller (i) receives, over the external network via the transceiver, a query pertaining to a designated one of the light sources, (ii) responsively sends a message to the designated light source over the internal network, (ii) receives a response from the designated light source over the internal network, and (iii) answers the query by sending a message over the external network using the transceiver.

The controller may, in some implementations, detect an anomalous operating condition by communicating with the at least one light source over the internal network. The controller may (i) receive, over the external network via the transceiver, a query relating to an operating condition of the at least one light source and (ii) transmit, over the external network using the transceiver, a responsive message based on whether an anomalous condition has been detected. The controller may, in some instances, send, over the external network via the transceiver, a message specifying an anomalous operating condition upon detection thereof.

In some embodiments, the apparatus further comprises a database—maintained locally and/or remotely—for storing external network information. In such cases, the controller may (i) receive, over the external network, a message intended for a device connected to the external network, (ii) use the database to determine a next hop for the message, and (iii) use the transceiver to transmit the message to a device corresponding to the next hop.

The database may store state information, in which case the apparatus may (i) operate in a slave mode if a master device is detected on the external network via the transceiver, (ii) operate in a master mode if designated as the master device on the external network, and when operating in the master mode, the controller may communicate with other devices on the external network and obtain state information therefrom, and maintain the state information in the database. In the master mode, the database may store state information from a plurality of devices connected to the external network, and the controller may be responsive to queries, received over the external network via the transceiver, involving (i) state information aggregated over at least some of the plurality of devices connected to the external network or (ii) state information for a designated device connected to the external network. In the master mode, the controller may issue an alarm signal over the external network if an anomalous operating condition is detected from the state information; and/or may detect and communicate with, via the transceiver, an interface device connected to the external network.

In some embodiments, the apparatus further comprises a sensor for obtaining environmental information, the controller being further configured to (i) receive, over the external network via the transceiver, a query relating to the environmental information and (ii) transmit, over the external network using the transceiver, a responsive message based on readings from the sensor.

In another aspect, the invention pertains to a system comprising a plurality of lighting modules configured for communication over an external network. In various embodiments, the system comprises a plurality of lighting modules each comprising a power supply, a controller, at least one light source, an internal network facilitating bidirectional communication between the controller and the light source(s), and a transceiver for communicating over the external network. The controller may be configured to (i) communicate over the internal network with the at least one light source to obtain state information therefrom and (ii) communicate the state information over the external network using the using the transceiver.

Each of the devices may comprise a local and/or remote database for storing state information and (i) operate in a slave mode if a master device is detected on the external network via the transceiver and (ii) operate in a master mode if designated as the master device on the external network, and when operating in the master mode, communicate with other devices on the external network and obtain state information therefrom, and maintain the state information in the database. In some embodiments, the system comprises a network controller for individually communicating with the devices over the external network.

In another aspect, the invention pertains to a method of communication among a plurality of lighting devices over an external network. In various embodiments, the method comprising the steps of communicating over an internal network, by a controller within a first one of the devices, with at least one light source within the first device to obtain state information therefrom; and communicating the state information over the external network. In some embodiments, the first one of the devices comprises a plurality of light sources therein, and the step of communicating over an internal network comprises selectively communicating with any of the light sources to obtain state information therefrom.

In various embodiments, the step of communicating over an internal network occurs over a power bus connected to the at least one light source, e.g., via impedance switching. The method may, in some instances, further comprise the steps of receiving, over the external network, a query pertaining to a designated one of the light sources; responsively sending a message to the designated light source over the power bus; receiving a response from the designated light source over the power bus; and answering the query by sending a message over the external network. The method may further comprise detecting an anomalous operating condition by communicating with the at least one light source over the power bus.

In some embodiments, the method further comprises receiving, over the external network, a query relating to an operating condition of the at least one light source; and transmitting, over the external network, a responsive message based on whether an anomalous operating condition has been detected. The method may involve sending, over the external network, a message specifying an anomalous operating condition upon detection thereof.

In some embodiments, the method further comprises the steps of storing external network information; receiving, over the external network, a message intended for a device connected to the network; using the stored external network information to determine a next hop for the message; and transmitting the message to a device corresponding to the next hop.

Some embodiments, involving master and slave modes, may further comprise the steps of storing operating information; operating in a slave mode if a master device is detected on the external network; operating apparatus in a master mode if designated as a master, and when operating in the master mode, (i) communicating with devices on the external network, (ii) obtaining operating information therefrom, and (iii) storing the obtained operating information.

In the master mode, the method may include steps of storing operating information from a plurality of devices connected to the network; and responding to queries, received over the external network, involving (i) operating information aggregated over at least some of the plurality of devices connected to the external network or (ii) operating information for a designated device connected to the external network. In the master mode, the method may comprise issuing an alarm signal over the external network if an anomalous condition is detected from the operating information and/or communicating with an interface device connected to the external network.

In various embodiments, the method may comprise steps of obtaining environmental information; receiving, over the external network, a query relating to the environmental information; and transmitting, over the external network, a responsive message.

As used herein, the term "network" broadly connotes any arrangement facilitating communication between nodes connected or connectable over the network. An "internal" network facilitates communication within a lighting module between a controller and one or more light sources (e.g., light-emitting diodes, or LEDs) of the lighting module. An "external" network permits wired or wireless networks among modules and between a module and an external device such as a computer, smart phone, tablet or other device capable of communication over the network. An external network may be maintained by an organization and/or may utilize the public telecommunications infrastructure. External networks include local area networks (LANs), wide area networks (WANs) and/or other types of networks. When used in a LAN networking environment, computers may be connected to the LAN through a network interface or adapter. When used in a WAN networking environment, nodes typically include a modem or other communication mechanism. Modems may be internal or external, and may be connected to the system bus via the user-input interface, or other appropriate mechanism. Nodes may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Wireless communications may also involve visible or non-visible (e.g., infrared) light. Furthermore, components of the system may communicate through a combination of wired or wireless paths.

For mesh networks, numerous schemes for message routing networks are known and may be employed herein; these include AODV, BATMAN, Babel, DNVR, DSDV, DSR, HWMP, TORA and the 802.11s standards.

BRIEF DESCRIPTION OF THE DRAWINGS

In the drawings, like reference characters generally refer to the same parts throughout the different views. In the following description, various embodiments of the present invention are described with reference to the following drawings, in which.

DETAILED DESCRIPTION

Embodiments of the present invention involve lighting modules capable of internal communication between a controller and one or more light sources over an internal network, and external communication over an external network. Described below are, first, an embodiment of a lighting module utilizing a power bus as an internal network medium, and then how such lighting modules may be enhanced to communicate over an external network having a conventional or mesh topology. It should be understood, however, that the present invention is not limited to any particular configuration of internal or external networks. Any lighting module having a controller capable of communicating, internally, with one or more light sources of the lighting module, and with nodes connected to or in an external network, is within the scope of the present invention.

1. Lighting Modules and Internal Communication

Figure 1:
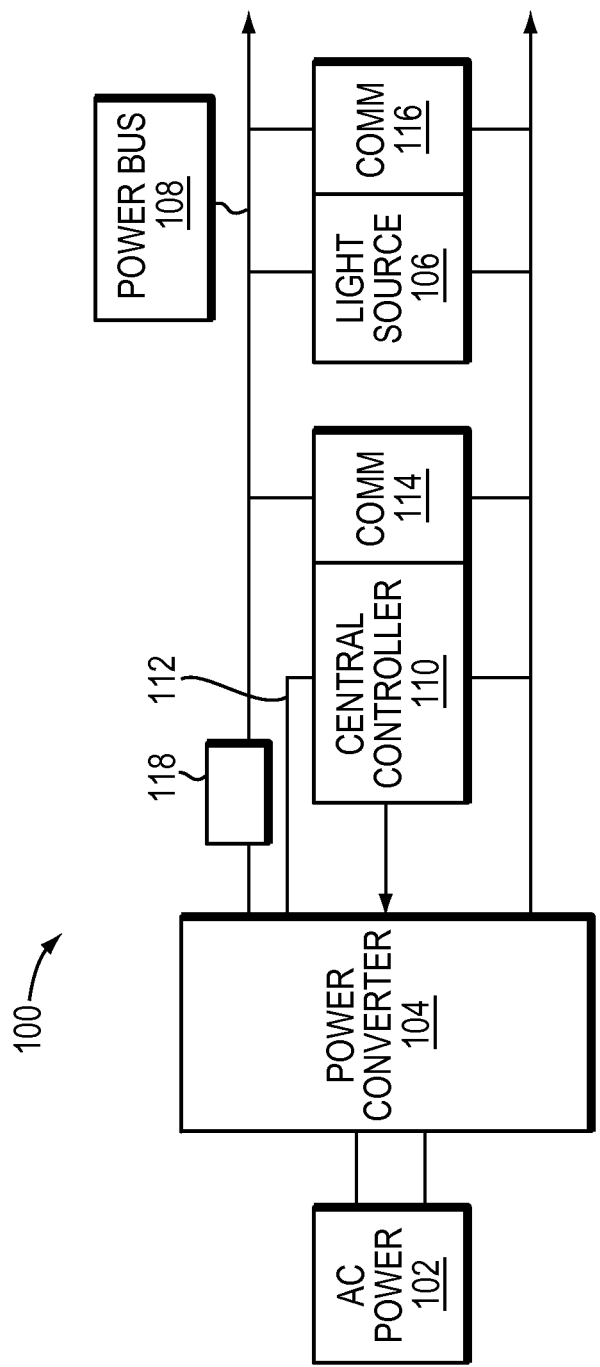
FIG. 1 block diagram of a central controller and a light source capable of internal communication in accordance with an embodiment of the invention.

FIG. 1 is a block diagram of a lighting system 100 implemented in accordance with embodiments of the present invention. An AC source 102 (e.g., a household wall socket or other suitable power supply) provides power to a power converter 104, which transforms the input power into a form suitable for powering a light source 106. Only one light source 106 is shown, but the system is capable of supporting a plurality of light sources 106 up to a maximum number supported by the maximum power output of the power converter 104. The converted power may be AC or DC power, in accordance with the requirements of particular applications and is distributed by a power bus 108. A central controller 110 communicates with the one or more light sources 106 using the power bus 108; the central controller 110 may be powered by a separate supply link 112, by the power bus 108, or by any other means. Communication ports 114, 116 may be used by the central controller 110 and light source 106, respectively, to interface with the power bus 108. A switch 118, disposed in series between the power converter 104 and the power bus 108, may be configured in either a low-impedance or high-impedance state, as determined by, e.g., the central controller 110. As explained in greater detail below, the switch 118 may be temporarily placed in a high-impedance state to allow communications among the central controller 110 and the light source 106 using the power bus 108. The light source 106 may have a unique address that allows the central controller 110 to designate it as the sole recipient or source of commands or data, respectively, even if additional light sources 106 are connected to the power bus 108.

Any voltage or frequency may be used by the power converter 104 to supply power to the light source 106 via the power bus 108, and the present invention is not limited to any particular voltage or frequency. Example voltages for the power bus 108 include 12 and 24 V, and example frequencies include 0, 50, 60, or 400 Hz. In one embodiment, the power bus 108 is a low-voltage bus, thereby increasing the safety in distributing power to the light source 106. The power converter 104 may include a voltage regulator (or similar circuit), thereby providing a reliable supply level to a variable number of light sources 106 (e.g., from one to five, ten, twenty, or more light sources 106).

In one embodiment, communications over the power bus 108 are initiated by the central controller 110. The switch 118 may be switched from a low-impedance (or "power mode") to a high-impedance (or "messaging mode") state by the central controller 110 to initiate communications. The central controller may include a digital processor (e.g., an ASIC, digital-signal processor, microcontroller, microprocessor, or other similar device) and/or analog circuitry to interface with the rest of the components in the system 112. An input/output interface may be used to receive commands from and/or send information to a user (via, for example, a USB, Ethernet, wireless, or other similar port). The central controller 110 may be used to turn the light source 106 on and off and/or set the dimming level of the light source 106 via the commands. Other commands from the central controller 110 may be used to configure the lighting system, calibrate the lights and/or measure LED junction temperature for thermal management. The central controller 110 may also include conventional on-board self-test, analysis, and configuration circuitry or algorithms to, for example, detect an over-temperature condition in the light source 106 and automatically reduce the brightness of the light source in response.

As described in greater detail below, a variety of addressing schemes may be used for two-way communication between the central controller and the light source 106. In one embodiment, the central controller 110 communicates with the light source 106 and requests a response therefrom. The central controller 110 then allots a communication response window, during which the central controller 110 is idle with respect to the power bus 108, to allow the light source 106 control of the power bus 108 (i.e., the light source 106 is allowed access to the power bus 108 and may vary the voltage of the power bus 108).

The light source 106 may be a module that includes a microprocessor, LED, LED driver, and/or a communication port 116, connected to the power bus 108. The power supplied to the central controller 110 from the power converter 104 may be separate from the power bus (via, e.g., the link 112) in order to allow the power bus 108 to be switched off while maintaining the power link 112 to the central controller 110. In the light source 106, the microprocessor may regulate the LED current and communicate with the central controller 110 via the power bus 108. The light source 106 may further include DC loads connected to the power bus 108 by rectifiers and/or capacitors for disconnecting the loads from the power bus 108 when the bus 108 is in message mode. The light source 106 may use buck, boost, or combination buck/boost driver circuits for the LEDs therein, depending on available bus voltage and required light voltage. The current invention is not, however, limited to any particular method of powering LEDs, and any system or method known in the art is within the scope of the present invention. The number of light sources 106 in the system 100 determines, at least in part, the total current in the power bus 108; the bus conductor size is selected accordingly to provide an acceptable distribution voltage drop.

Figure 2A:
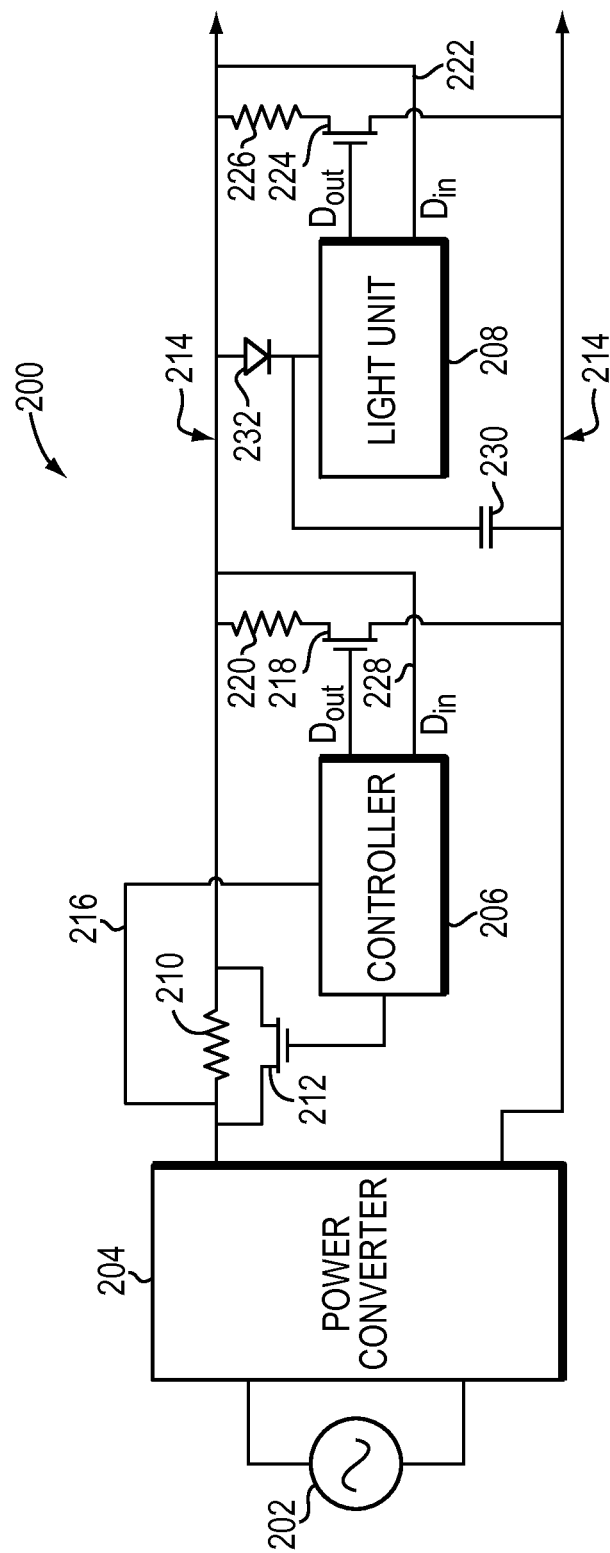
FIGS. 2A and 2B are schematic block diagrams of internal communication ports in accordance with embodiments of the invention.
Figure 2B:
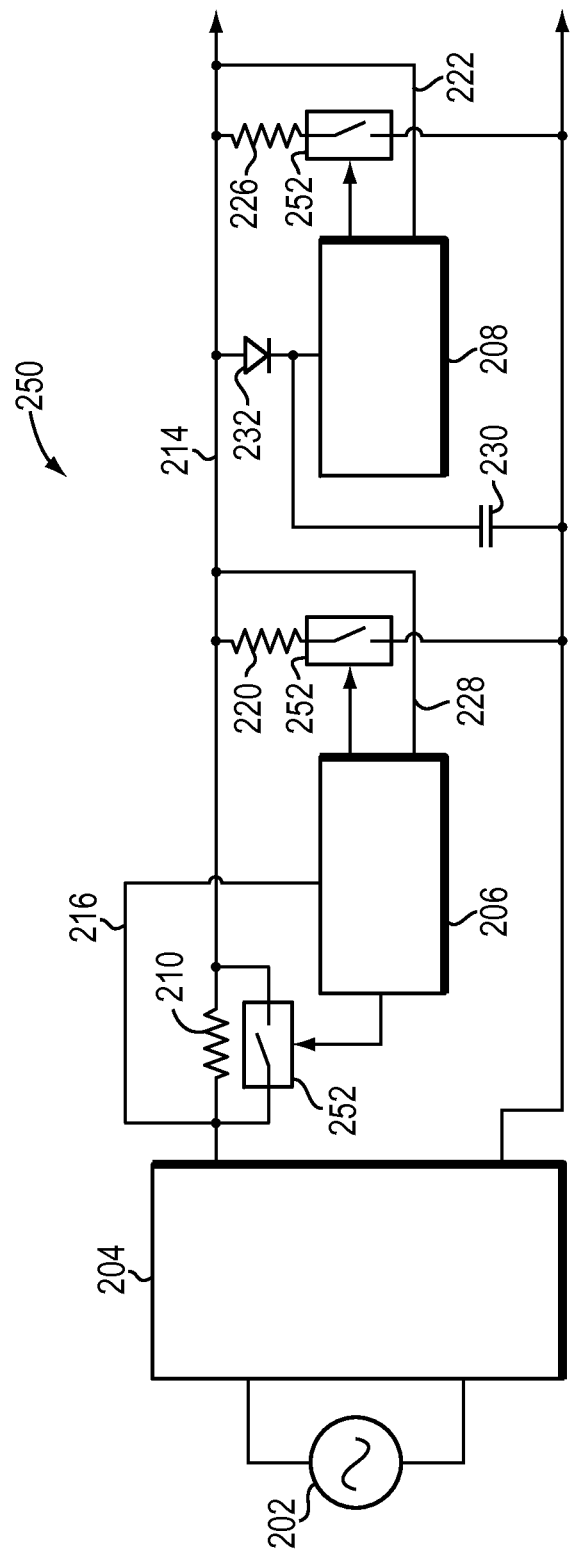

One implementation 200 of a lighting system in accordance with embodiments of the current invention is illustrated in FIG. 2A. An AC source 202, power converter 204, central controller 206, communications port circuitry and light source 208 are disposed in the system 200 as described above with reference to FIG. 1. The switch 118 is implemented using a source load 210 and a field-effect transistor ("FET") 212, the gate terminal of which is controlled by the central controller 206. When an appropriate voltage is applied to the gate of the FET 212 so that a channel forms in the FET between its source and drain, power flows from the power converter 204 to the power bus 214 via the low-impedance path provided by the channel of the FET 212. When the gate voltage of the FET 212 is adjusted such that the FET 212 transitions to a high-impedance state, the source load 210 partially isolates the power converter 204 from the power bus 214, allowing manipulation of the voltage on the power bus 214 in accordance with the communications system described herein. Any type of voltage- or current-controlled switching device may be used, however, and the current invention is not limited to only a switch based on the FET 212. FIG. 2B illustrates, for example, an embodiment 250 using generic switches 252. Power may be supplied to the central controller 206 via a link 216 on the power-converter side of the source load 210 so that power to the central controller 206 is not interrupted by the turning off of the FET 212.

In one embodiment, communication between the central controller 206 and the light source 208 is accomplished by pulling down the voltage on the power bus 214 (e.g., to approximately half the normal DC power voltage) for short durations, i.e., imposing negative pulses onto the power bus 214. The controller 206 may apply a negative pulse to the power bus 214 by activating a second FET 218 to switch in a communication load 220 across the lines of the bus 214. An input port 222 on the light source 208 detects the negative pulses. The light source 208 may similarly assert a negative pulse on the power bus 214 using a FET 224 and communication load 226, and the central controller 206 may detect the pulse at an input port 228.

When the power bus 214 is in message mode (i.e., the FET 212 is switched off and the power converter is separated from the power bus 214 by the source load 210), the light output by the light source 208 may be affected by the variations on the power bus 214. A capacitor 230 may be used to store charge to maintain an LED drive voltage appropriate for the light source 208 during the communication pulses. A diode 232 may be used to isolate the capacitor 230 from lower voltages on the power bus 214 and prevent charge from being siphoned off thereto and affecting message transmission.

The signaling pulses on the power bus 214 may be short-duration negative pulses having duration of approximately 10 µsec, during which time the light source 208 is powered by the capacitor 230. The pulses may be varied in terms of width and interval, or may be of a single width, having a consistent interval between pulses. As described in more detail below, the light source 208 monitors incoming pulses for information encoded in their width, interval, presence, or other attribute and interprets commands based on the received pulses.

In one embodiment, the communication loads 220, 226 are equivalent to the output impedance (i.e., the small internal resistance of the power converter 204 and the relatively larger resistance of the resistor 210) of the power converter 204, thereby producing negative pulses having an amplitude of half the DC power voltage output by the power converter 204. In one embodiment, the central controller 206 and light source 208 receive data from the power bus 214, via the input ports 228, 222, using a comparator having an appropriate threshold between the high and low amplitudes of the bus communication voltages. Lower-amplitude communication pulses may be desirable for electromagnetic compatibility and may be implemented by providing the communication loads 220, 226 with a higher resistor value than the source load 210.

Figure 3:
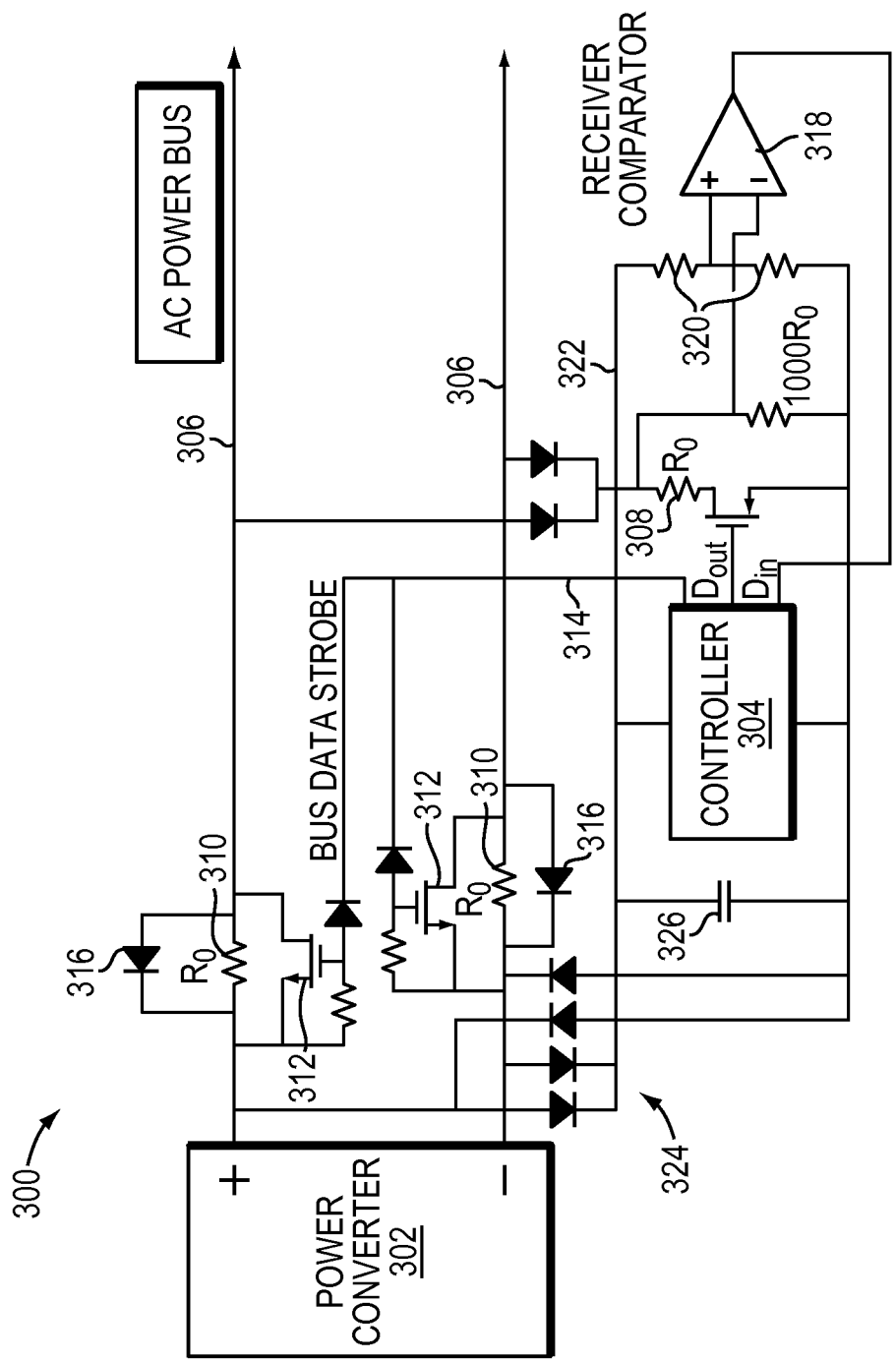
FIGS. 3 and 4 are schematic block diagrams of an internal interface with an AC power bus in accordance with embodiments of the invention.

FIG. 3 illustrates another embodiment 300 of a power converter 302, central controller 304, and associated communications port circuitry that is, in this case, configured as a message initiator for communicating over an AC power bus 306. Messages may be placed on the power bus 306 by loading the bus with a messaging load 308 and switching the power converter source impedance 310 from low to high impedance, thereby switching the bus 306 from power to messaging mode. The messaging load impedance 308 and source impedance 310 may be matched (i.e., equal) and may each have a value of approximately 200 ohms. Thus, when both loads 308, 310 are enabled, the bus voltage is reduced to approximately half of its nominal, power-mode voltage. With only the messaging load 310 present, the bus voltage remains at nominal voltage until the messaging load 308 is introduced.

The central controller 304 switches or strobes the source load 310 to the messaging load 308, by manipulating the gate voltage of the FETs 312, for short time intervals to produce a signaling pulse on the power bus 306. To place the bus 306 in power mode, the central controller 304 holds a bus-data-strobe signal 314 low, which provides a gate turn-on voltage to the two power FETs 312 that bypass the source loads 310 at the output of the power converter 302. Although two source loads 310 are provided for an AC supply, only one at a time is inserted for messaging, depending on the polarity of the power supply voltage at the time the messaging pulses are introduced. When the data-bus-strobe signal 314 is low, the FET 312 on the positive side of the supply 302 conducts, as does the diode 316 on the negative supply side. When a message pulse is introduced, the data-bus-strobe signal 314 is asserted high, thereby turning off the high-side power FET 312 and inserting the source load 310. When a messaging load 308 is present at the time the strobe signal is asserted, the bus voltage drops to half the bus voltage immediately prior to the messaging mode.

The system 300 may also be configured to receive communication pulses from, e.g., light sources connected to the power bus 306. In this case, the central controller 304 holds the bus-data-strobe signal 314 low, as described above, but does not assert the messaging load 308. The power bus voltage is applied to the input of a comparator 318, which compares the bus voltage to a reference value (generated by, for example, a resistor divider 320). The impedance ratio of the resistors in the resistor divider 320, and the reference value generated thereby, may be determined by the ratios of the impedances of the source and messaging loads 310, 308. Once a light source places a negative pulse on the power bus 306, the voltage on the bus 306 falls below the reference voltage, and the comparator 318 registers this change by sending a command signal to the central controller 304. Any method known in the art of detecting a voltage level may be used to detect the presence of a pulse on the power bus 306, however, and the current invention is not limited to use of a comparator. In one embodiment, different voltage levels on the power bus 306 correspond to different bits of binary information.

The central controller 304, which may include digital logic, may be powered by a local DC power bus 322. The DC voltage on the local bus 322 may be generated from the AC output of the power converter using, for example, a diode rectifier 324 and a filter capacitor 326. The local bus 322 may also be used to supply power to the resistor divider 320, or for any other component or system that requires DC power.

In other embodiments, devices other than the power FETs 312 are used for switching the bus 306 between power and messaging modes. One example of such a device is a gate turn-off thyristor, which may be turned off by a gate signal before zero-conduction current is reached. Another device is a silicon-controlled rectifier or standard thyristor operated using a high-frequency AC supply. At a high AC supply frequency, for example 100 KHz, the bus 306 may be switched to communication mode for the duration of a first AC half-cycle and returned to power mode on the next AC half-cycle. Using such switching methods, a single messaging-load resistor may be used. The present invention is not limited to any particular implementation of bus-switching circuit, however, and any equivalent circuits are within the scope of the present invention.

The nominal voltage on the power bus 306 may determine the message signal amplitude. In one embodiment, for the AC power bus case, messaging pulses are placed on the bus 306 only when the bus voltage is greater than a minimum value. The central controller 304 may monitor the bus voltage to assure that the bus minimum voltage is exceeded before beginning a message sequence.

Figure 4:
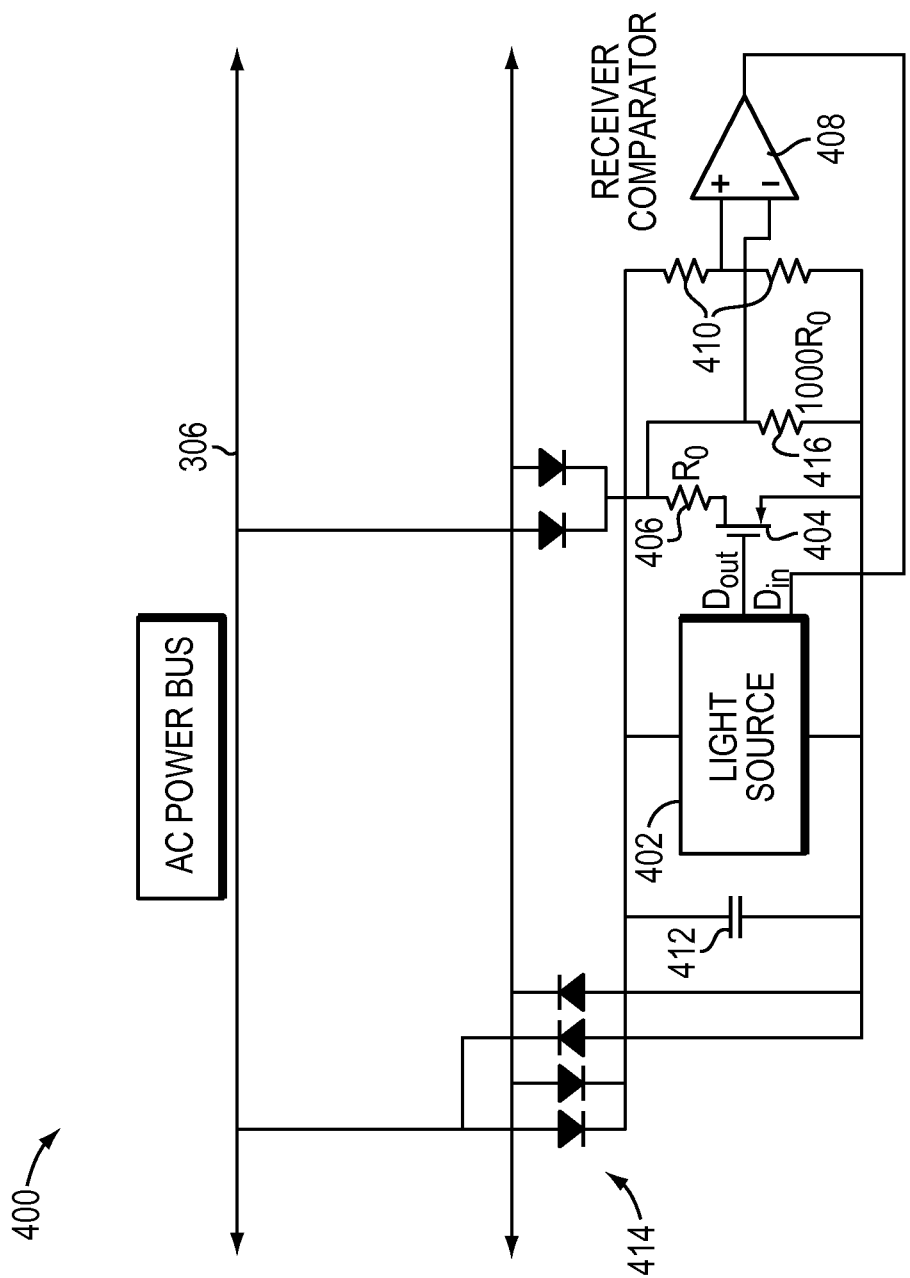

FIG. 4 illustrates an embodiment 400 of a light source 402 and associated communications circuitry configured for communicating over the AC power bus 306. Like the central controller 304, the light source 402 places a pulse on the power bus 306 by asserting a FET 404, thereby pulling the voltage on the power bus 306 down through a message load 406. The light source may receive incoming pulses by monitoring the voltage on the power bus 304 with a comparator 408, which compares the power bus voltage to a reference voltage generated by a resistive divider 410.

When the bus 306 is placed in messaging mode by the central controller 304 (by, e.g., strobing the bus data signal 314), the power converter 302 no longer provides current for the light source 402. Instead, power is provided by one or more filter capacitors 412. In messaging mode, the bus voltage drops until the rectifiers 414 that connect the light source 402 and filter capacitor 412 to the bus 306 stop conducting as the forward-biased junction voltage is reduced. The bus voltage drops further due to the loads presented by the receiver comparator input circuits 410 and the messaging load 406, if asserted. A comparator input resistor 416 is sized at approximately 1000 times the size of the messaging load 406 to assure a low bus voltage is placed at the comparator 408 without significantly loading the bus 306 when multiple loads (i.e., multiple light sources 402) are present. The resistor 416 discharges parasitic capacitance on the bus 306 and receiver input circuit 410 to assure the messaging bus voltage is presented to the comparator 408.

In one embodiment, the responder messaging pulses are placed on the power bus 306 by action of both central controller 304 and light source 402. The central controller 304 strobes the source messaging impedance 314 while the light source 402 has placed (or not placed) a messaging load 406 on the bus 306 to produce a responder message pulse (or lack of pulse). The light source 402 may place the message load 406 on the bus before the strobe occurs; the light source 402 may detect when the strobe occurs by means of a communication clock synchronized to an initiator frame.

Figure 5:
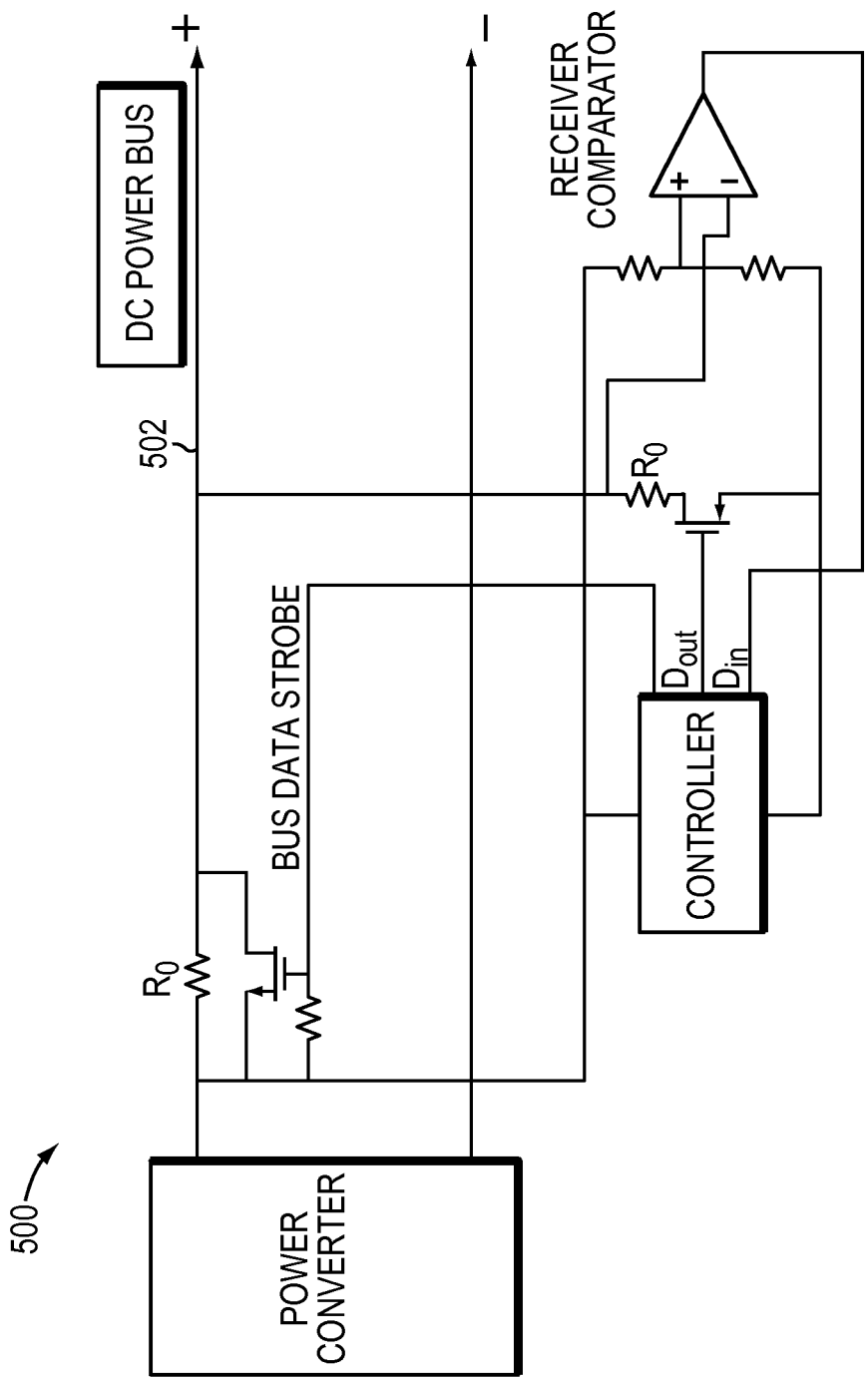
FIGS. 5 and 6 are schematic block diagrams of an internal interface with a DC power bus in accordance with embodiments of the invention.
Figure 6:
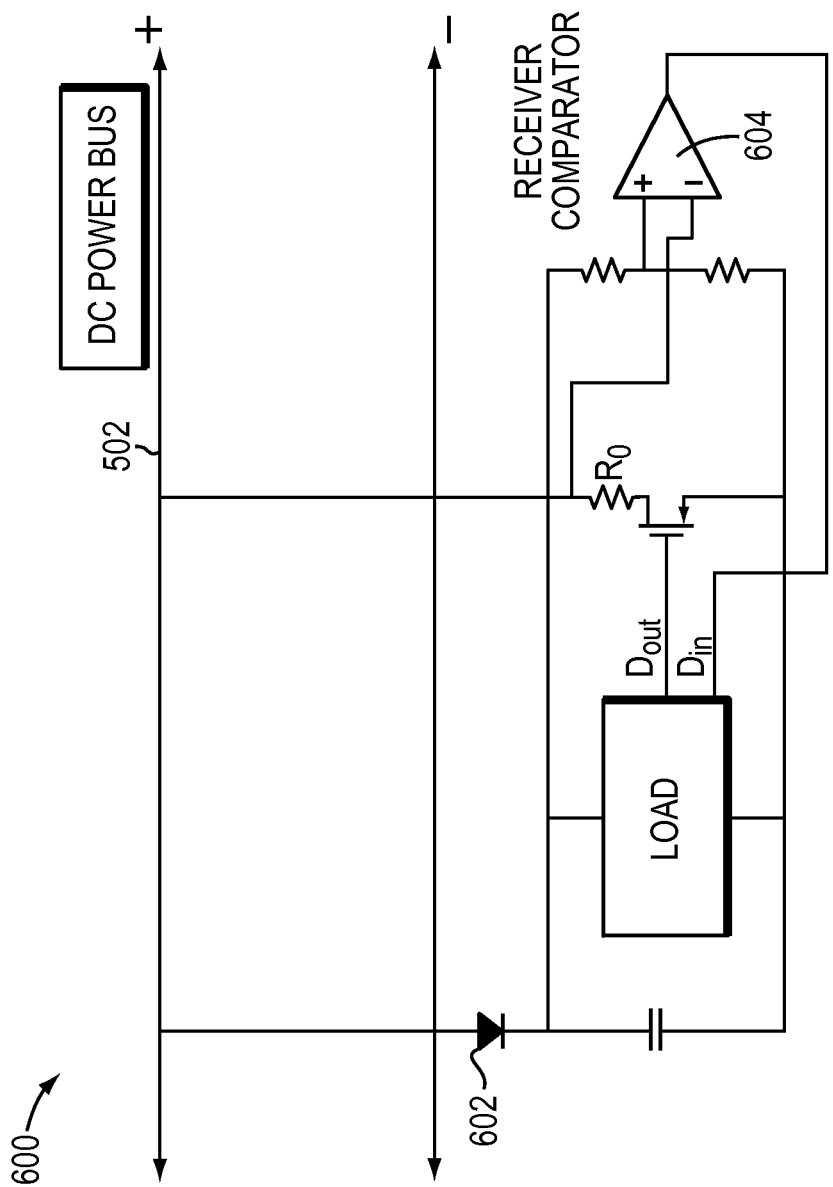

FIGS. 5 and 6 illustrate central-controller 500 and light-source 600 circuits, respectively, for a DC power bus implementation. The modification to the central controller 500 for the DC bus 502 removes one power-converter messaging source impedance, one bypass-power FET, and the full-wave rectifiers for the messaging initiator and its receiver comparator. For the light source of FIG. 6, the full-wave rectifier for the load is replaced by a single diode 602, and the receiver comparator 604 is directly connected to the positive bus conductor 502. The comparator input resistor may be eliminated.

Figure 7:
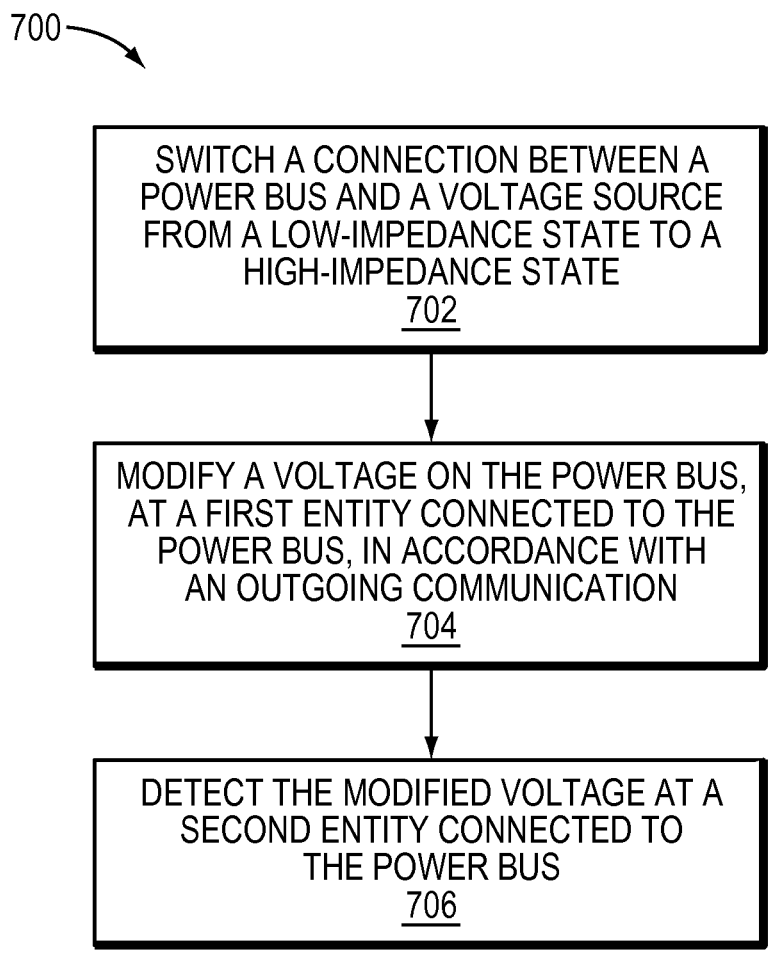
FIG. 7 is a flowchart of a method for internal communication among entities on a shared power bus in accordance with an embodiment of the invention.

A method of using an embodiment of the current invention, in accordance with the implementations described above, appears in a flowchart 700 in FIG. 7. With reference also to FIG. 2A, in a first step 702, a connection between the power bus 214 and the voltage source 204 is switched from a low-impedance state to a high-impedance state (using, for example, the FET 212). In a second step 704, a voltage on the power bus 214 is modified at a first entity connected to the power bus, in accordance with an outgoing communication. For example, the central controller 206 may pull down the voltage on the power bus 214 using the FET 218 and the resistor 220; in another embodiment, the light unit 208 sends a communication by pulling down the power bus with FET 224 and resistor 226. In a third step 706, the modified voltage is detected at a second entity connected to the power bus (e.g. the central controller 206 or the light unit 208, using the input ports 228, 222), thereby receiving the communication at the second entity.

When multiple light sources are present in a system, as is often the case, the central controller may need to uniquely identify one of the light sources, determine how many light sources are present, or identify which light source is sending incoming data. Each lighting unit may thus be assigned a unique identifier. When a light source detects, on the power bus, a sequence of pulses corresponding to its identifier, the selected lighting unit may "wake up" in response, in the manner of, for example, a network node responding to a MAC address on a local area network.

In one embodiment, a plurality of light units is each provided with a unique address to allow the central controller to select a particular light source as a recipient of a message. A complete message may include an initiator frame followed by a responder frame. The initiator frame may include a plurality (e.g., four) of fields, such as wake-up, address, command and data fields. The responder frame may include a preamble field and data field. The response frame may be a special field used for address map queries by the initiator. In this embodiment, the response field may be a single long-duration pulse or a single short-duration pulse.

The wake-up field of the communication frame includes a sequence of pulses that identifies the start of a message and provides synchronization to a data clock. The rest of the message may be encoded to maintain self-clocking of the data in the message, as is known in the art, which may assist clock recovery and/or detection at the receiver. Embodiments of the invention may use, but are not limited to, non-return-to-zero ("NRZ") or Manchester transmission protocols. Following the initiator frame, a responder frame is transmitted onto the data bus. The responder frame, sent by the responder, may be assisted by the initiator, which further provides bus data strobes to clock the data onto the bus while the responder controls the messaging load on the bus. The strobe clock continues at the nominal frequency while the responder switches the communication impedance onto the bus and monitors the bus for the expected data pulses.

As noted above, to establish communication and provide thermal management of the lighting units, the central controller may identify and address each lighting unit uniquely. When the lighting system is first installed, or when a lighting unit is added to a system, it is likely that several lighting units have the same communication address. Various approaches to detecting this condition and reassigning addresses are described below.

The lighting units typically have non-volatile memory registers (e.g., electrically erasable programmable read-only memory, or EEPROMs) for storing address information. If non-volatile memory is not provided, then the central controller may reconfigure the lighting units after each power-on cycle. Non-volatile memory allows for monitoring of light-source usage history and its environment, which enables failure prediction for enhanced system reliability. During address configuration, the lighting units may be turned on with a nominal light output setting until configuration is complete. This action may be accomplished using, for example, a global command for turning on the lights.

In one embodiment, an eight-bit address register is used; this register may support up to 255 unique lighting units and, optionally, a reserved address. Registers of any size may be used to support any number of lights, however and the current invention is not limited to any particular register size.

A communication protocol for the lighting system may involve the central controller beginning a communication interval by sending a prescribed set of pulses onto the power bus as a wake-up signal. After the wake-up signal completes, a target address, a command code, and/or optional datafield may be sent by the central controller over the bus; and the command code and/or datafield are recognized by the lighting unit having the target address. Following a send-time interval (to allow for, e.g., the wake-up, address, command, and data fields), the addressed lighting unit may respond by imposing onto the power bus a pulse sequence corresponding to a response code and optional data, which are received by the central controller during a response-time interval. This sequence—the send-time interval and the response-time interval—completes one communication interval. Global commands to all the lighting units may be identified by sending the reserved address instead of a target address.

In one embodiment, to configure unique addresses for each lighting unit, an address occupation map is created for the lighting units in the system. The address occupation map may be arranged as a table or database stored in non-volatile memory of the central controller, and lists the available addresses with the status of unoccupied, single-occupied, or multiple-occupied lighting unit addresses. To populate this table, a query command is sent over the power bus to each of the 255 available addresses requesting a response pulse. For this command, the duration of the response pulse is sufficiently long that multiple lighting units with the same address may simultaneously load the power bus. The central controller can identify if none, one or multiple lighting units occupy the sent address by examining the amplitude of the negative pulse during the response. No lighting unit at the queried address is indicated by no response; one light at the address is indicated by a nominal pulse amplitude; and multiple lighting units are indicated by a larger-than-nominal (lower absolute voltage) pulse. The central controller scans all 255 addresses to build the address occupation map; multiple occupied addresses are reassigned among unoccupied addresses as described below.

In another embodiment, random time delays may be used for the responses to the address-query command in order to separate the responses in time. In this embodiment, each lighting unit at the queried address responds after a random time delay, which is determined by a random-number generator in the lighting unit, and the central controller counts the number of responses for each queried address. The random-number generator may base its output on any available digital or analog signal containing sufficient noise; examples include the analog-to-digital converters for measuring LED current sense voltage or other voltages, the commanded LED current in a closed-loop current regulator, or any other digital or analog signal containing noise. The least-significant bits that are dependent on noise are selected to provide the random number. The random time delay is provided by a time-interval counter preset with the random number. After the random time delay, the lighting unit responds by applying pulses to the power bus if no other lighting unit is currently responding. If another lighting unit's response is in progress, as determined by the current state of the power bus, the lighting unit further delays its response, thereby ensuring that simultaneous responses do not occur. The absence of a response indicates that the queried address is unassigned; one lighting unit at the address is indicated by one response; and multiple lighting units are indicated by more than one response. The central controller may store this information for the queried address and scan all 255 addresses to complete the table.

In one embodiment, when multiple lighting units occupy an address, the central controller reassigns addresses by sending an address-reassignment command to the lighting units sharing one address, along with an available unoccupied address in the data field. Upon receiving this command, the lighting units randomly decide to assume the new address or retain the original address. This decision may be based on a random-number generator in each lighting unit; the random numbers may be generated as described above. The least-significant bit of the data word is selected to decide whether or not to assign a new address for the lighting unit. With the lighting units independently assuming one of two addresses in this random process, the central controller may then scan the two addresses and update the stored table of unoccupied, single, and multiple occupied addresses of the original address scan. The address reassignment sequence is iterated until all lighting units have been assigned unique addresses. Alternatively, the number of addresses that are randomly selected by the lighting units may be increased by using more data bits in the random number. For example, two bits provide for selection among four addresses, three bits provide eight addresses, and so on.

In another embodiment, the lighting units randomly select address extensions to assign themselves unique addresses. In this approach, the lighting units that share a common address are commanded by the central controller to randomly select a number in a predetermined range as an address extension to their base addresses. A random number generator, as described above, may be used to select the address extension, which is the required number of least-significant bits of a noisy digital signal. An example of the range of numbers for the address extension is 0 to 15 (in hexadecimal, 0x0 to 0xF) defined by a 4-bit binary number, but any convenient range may be used. To address a light source by its address plus address extension, the base address is sent with a command defined for an address extension followed by the address extension in the data field. In this way, the central controller scans the sixteen (e.g.) address extensions at the shared address to create a list of single-occupied extensions and multiple-occupied extensions. Both the single- and multiple-occupied extensions may be reassigned available unique base addresses, and the original table of unoccupied, single-, and multiple-occupied addresses is updated with this change. In sequence, all multiple occupied addresses are commanded to randomly select new address extensions, then scanned and reassigned new unoccupied addresses and the occupation table updated. This process may proceed through all multiple-occupied addresses until all lighting units are reassigned unique addresses.

In some embodiments, addresses may be manually assigned. This approach may be advantageous, for example, when one or more lighting units are added or replaced in the lighting system. This approach ensures that usage and temperature history data for the lighting units, stored in, e.g., non-volatile storage in the central controller, remains valid when the system is serviced or altered by adding or replacing lighting units. One implementation uses a polling scheme for the central controller to query the lighting units for a system change status. The lighting units are each provided with a non-volatile memory location (e.g., one or more data bits in EEPROM), which is set during manufacturing to indicate that the lighting unit has not been configured. This memory location may also be set manually, after a service procedure, to indicate that the lighting unit requires address configuration and possibly other procedures for tracking usage history. A switch may be provided on the lighting unit to manually set the EEPROM to request configuration.

The central controller may poll the lighting units with a command to the reserved common or global address. Any lighting units with the condition set in EEPROM indicating an unconfigured status may respond to this poll. If there is a response to the poll, the central controller assigns an available unused address to the responding lighting unit or units, which then reset the EEPROM condition to indicate that configuration is no longer needed. The central controller proceeds through the above-described procedures to assign unique addresses if multiple lighting units share the newly assigned address. The polling command may be issued periodically by the central controller, or it may be initiated by the service person by operating a switch on the controller.

Figure 8:
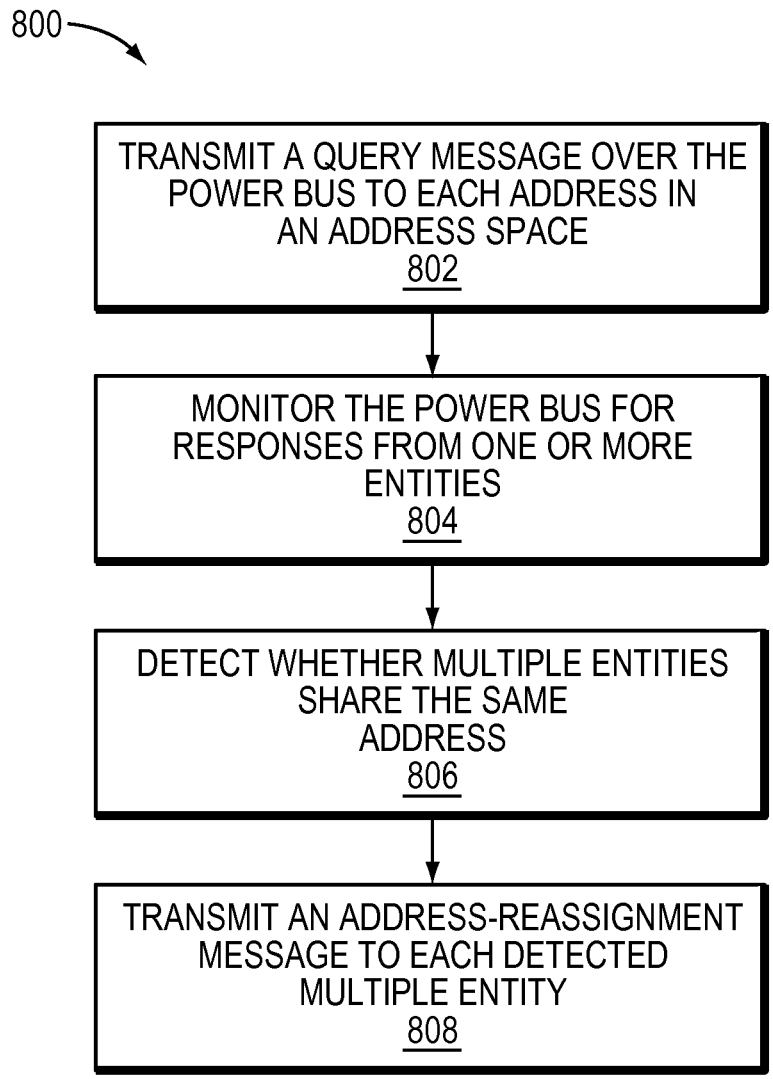
FIG. 8 is a flowchart of a method for detecting and reassigning addresses for entities initially assigned the same address in accordance with an embodiment of the invention.

One embodiment of a method for assigning unique identifiers to a plurality of entities (e.g., light sources) connected to the power bus is shown in FIG. 8. In a first step 802, a query message is transmitted over the power bus to each address in an address space used by the plurality of entities. In a second step 804, the power bus is monitored (by, e.g., the central controller), for each queried address, for a response from one or more entities. In a third step 806, whether multiple entities share the same address is detected based on the response communication. In one embodiment, the central controller determines whether zero, one, or more than one light sources are assigned the address by monitoring the level of the voltage on the power bus, as described above. In a fourth step 808, an address-reassignment message is transmitted (e.g., by the central controller) to each detected multiple entity.

2. External Communication

Figure 9A:
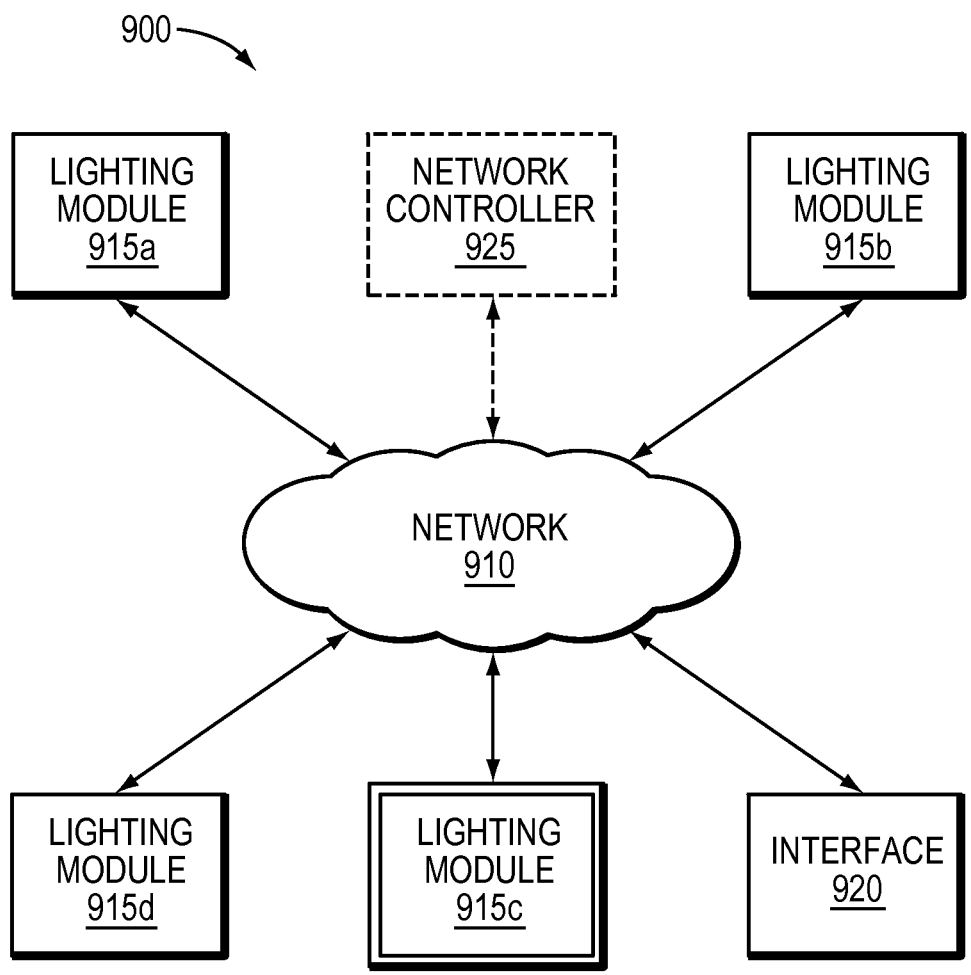
FIG. 9A schematically depicts an external network including a plurality of lighting modules and an interface device.

FIG. 9A illustrates a representative system 900 including an external network 910 over which a series of lighting modules 915a-915d intercommunicate. As noted previously, the external network 910 may be wired and/or wireless, and may be an enterprise network, the Internet, an intranet, the public telecommunications infrastructure, etc. In one particular embodiment, the external network 910 utilizes, as the network medium, power lines that run through a home or building, and communication thereover occurs via "power line networking" using interface adapters well known in the art. Thus, each lighting module can be connected to the power lines (e.g., plugged into a wall outlet, wired in via a junction box, etc.) both to obtain power and for communication. Internally, the module controllers and light sources may interrupt the power signal as described above in order to communicate; so long as these interruptions occur only for a small portion of the duty cycle of the power signal, the power line network will be able to tolerate it (with error correction, if necessary).

One or more interface devices, representatively denoted at 920, may be connected to the network. The interface device 920 facilitates communication with one or more of the lighting modules 915, obtaining data therefrom and/or sending commands thereto. As noted, the interface 920 may be a computer, tablet, telecommunication device, etc. In conventional networks, a network controller 925 manages the operation of the network including the entry and departure of interfaces 920, while in mesh networks, interfaces 920 may enter and leave the network 910 on an ad hoc basis. In fact, in a mesh topology, the network 910 is really an abstraction that does not exist independently of the devices connected to it; instead, the network 910 represents a shared communication protocol according to which each of the connected devices 905, 920 communicates with the others in an organized fashion that allows each device to send and receive messages to and from any other device. If all devices are within range of each other, they may send messages (which may be in the form of data packets) over a fixed frequency using a local area network (e.g., a ring topology) or other suitable network arrangement in which each device "multicasts" messages to all other devices in accordance with a communication protocol that allocates network time among the devices. Typically, however, a more advanced routing protocol is used to permit messages to reach all devices even though some are out of radio range of the message-originating device; each device maintains a routing table indicating which devices are within its range and propagates received messages to neighboring devices in accordance with the protocol.

Figure 9B:
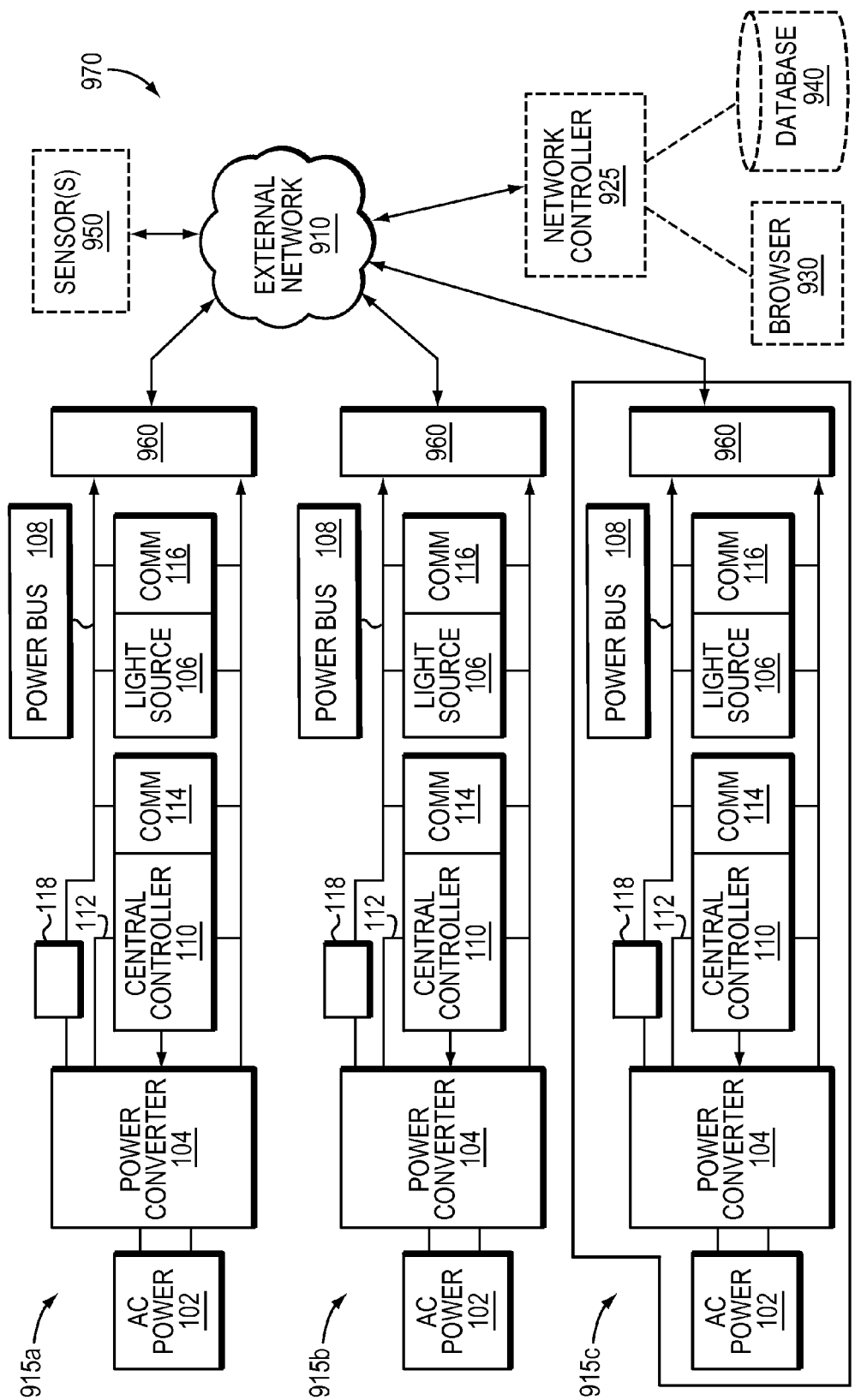
FIG. 9B schematically depicts in greater detail embodiments of the lighting modules, which include an internal network, connected to an external network.

With reference to FIG. 9B, the controller 925 or an interface 920 may run a web browser 930 and communicate, via the Internet, with a selected webserver in the various lighting modules 915—each of which has a different Internet address. As explained in greater detail below, the controller 925 or an interface 920 may include a database 940, and one or more sensors 950 may also be connected to the network 910.

As illustrated in FIG. 9B, the lighting modules 915 include the components described above in connection with lighting modules 100. In the illustrated embodiment, the internal network 970 utilizes the power bus 108 of the associated module 915. In addition, each lighting module 915 includes a set of additional components, collectively indicated at 960, that facilitate communications, support desired network behavior, and store data. These components 960 are illustrated in greater detail in FIG. 10 and will be described, first, in connection with a mesh network topology. The central controller 110 of the lighting module 915 is capable of executing program instructions stored in a system memory 1005. The device 915 communicates with other similar devices by means of a conventional transceiver 1010, which may be configured for wired or radio communication (via an antenna 1015). As noted, devices 915 may alternatively communicate over wires or by means of visible or non-visible light—even, in some embodiments, the light emitting for illumination purposes by the lighting module 915 (in which case the lighting module also includes a light detector or is configured to use an inactive LED as a detector).

System memory 1005 may be composed of a combination of volatile RAM for temporary storage and processing, and non-volatile memory (Flash, read-only memory ("ROM"), programmable read-only memory ("PROM"), etc.) that contains permanent aspects of the device's operating instructions. A general programming block 1020 contains instructions executable by the controller 110 to perform the basic operations of the device 915 involving the external network 910. A master device protocol 1030 contains instructions for performing the functions associated with a master device, so that the device 915 can assume this role if so designated or elected. A slave device protocol 1040 contains instructions for performing the functions associated with a slave device. The slave protocol 1040 is the default protocol executed by the central controller 110. These functions are described in greater detail below.

In mesh-network implementations, the device 915 includes a database 1050, which may be a memory partition or a separate memory device. The database 1050 may store general information about the device 915 (including, in some implementations, an election priority for purposes of designating a new master device upon failure of the current master or its removal from the network 910) and device state information (e.g., operating status of each light source, total current being drawn, and any diagnostic parameters that are deemed useful for the central controller 110 to gather and/or compute). The master device 915 maintains this information for all devices currently connected to the network 910. In some implementations, each slave device maintains this information only for itself and provides it to the master device upon query—e.g., when a new device assumes the role of master, and periodically as the master polls slave devices to update the field values. But more typically, all devices maintain complete databases that include entries for all network-connected devices in order to facilitate immediate assumption of the role of master device. In addition, at least the master device maintains in the database 1050 network information including a list of the other devices 915 connected to the network and their network addresses (or other addressable identifer, e.g., a MAC address).

Figure 10:
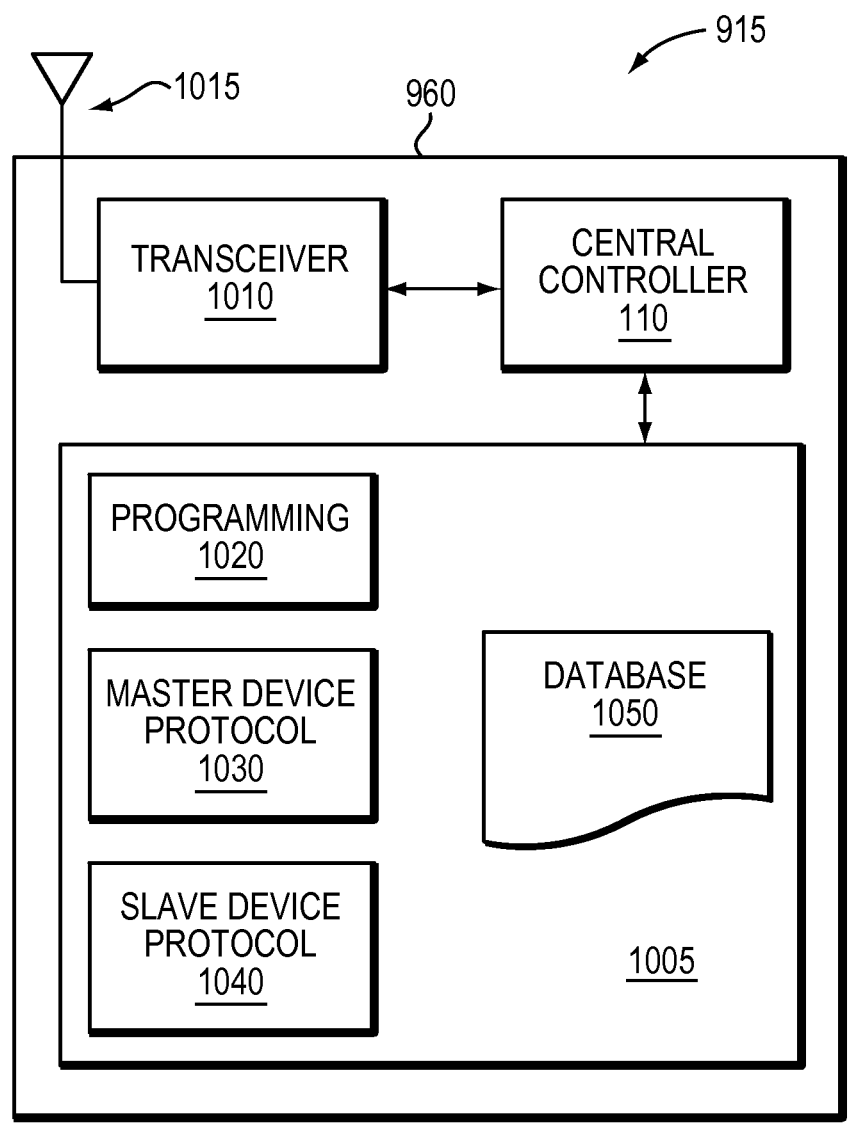
FIG. 10 illustrates the network-related components of a representative lighting module.

In operation, and with reference to FIGS. 9A, 9B and 10, suppose the device 915c has been designated the master device. If a new device 915d enters the network (using the proper network protocol and appropriate security credentials), its presence is registered by all other connected devices and it become part of the mesh network 910. If the master device 915c exits the network, it is removed from the device lists stored on the other devices, and a conventional selection protocol chooses a new master device from the devices currently part of the network 910. It should be noted that the manner in which a device 915 enters the network is not critical; it may involve a wireless handshaking protcol, a wired connection, momentary physical contact (i.e., bumping) another device 915 in the manner of certain mobile phones, etc.

In addition, responsible system personnel may connect one or more interfaces 920 to the network 910 in order to examine the status of the devices 915. Upon detection of the entry of the interface 920, the device 915c (i.e., the master device) reports to the interface 920 the status of all devices 915 as currently represented in the database 1050 of the master device. Furthermore, the interface 920 will receive, along with the master device 915c, reports of anomalies (or other reportable events) by any of the devices 915. Each report identifies the transmitting device 915, the type of anomaly, and current status. For example, in the case of failure of a light source, the report would identify the specific light source that has failed; in this instance, the system operator schedules a repair, which may not be necessary immediately depending on the number of light sources in the affected lighting module and its location, but ultimately will involve human intervention. In other cases, the anomaly may involve diminished output of a light source and consequent action taken on-board by the associated controller 110 to, for example, adjust the individual light source or increase the current supplied across the power rails to compensate. Although this condition may indicate the possibility of future failure, for immediate purposes it may merely be registered in, for example, a database 940 associated with the interface 920. Particularly when associated with a permanent network controller 925 in a conventional database topology (as shown in FIG. 9B), the database 940 may accumulate significant historical data that may be queried and analyzed to identify trends relevant to the performance of the lighting modules 915. For example, an increased frequency of failure rates may be noted in connection with lighting modules deployed in a particular location, which may lead to alteration of the location's environment or gradual replacement of the lighting modules with models better suited to stressful conditions.

In some embodiments, the interface 920 or network controller 925 may directly communicate with any of the modules 915 based on an identifier suited to the network topology employed, e.g., a URL in the case of the Internet or an intranet, a MAC address in the case of a LAN, etc. Personnel operating the interface 920 may, for example, query the module to obtain more detailed information not ordinarily reported to the master device; the associated module controller 110 receives the query, obtains the requested data (e.g., by itself querying a light source over the internal network, enabling the requesting operator to effectively interact, via the external and internal networks, with a particular light source) and sends it, via the external network 910, to the requesting interface 920. Alternatively, the operator may use the interface 920 to remotely change the operating parameters (or even replace or modify the programming) of the addressed module.

In other configurations, individual modules are not queried directly by an interface 920, but instead, queries or commands are routed through the current master device. This avoids excessive network traffic if, for example, the desired information is already stored on the master device.

In a mesh topology, the lighting modules 915 may communicate with each other as well as with an interface 920. As noted, the devices 915 may maintain, in their databases 1050, network information including a list of the other devices 915 connected to the network and their network addresses (or other identifiers). In addition, the database 1050 may contain routing tables or maps reflecting nearest neighboring devices, measured in terms of inter-device transmission time or "hop length." In this way, the devices 915 may act as repeaters to propagate a message across the network of devices 910—i.e., a message intended for a distant device will traverse the shortest path through the network as a series of hops based on the contents of routing tables stored in the device databases 1050.

Any suitable programming language may be used to implement without undue experimentation the functions of blocks 1020, 1030, 1040. Illustratively, the programming language used may include assembly language, Ada, APL, Basic, C, C++, C*, COBOL, dBase, Forth, FORTRAN, Java, Modula-2, Pascal, Prolog, Python, REXX, and/or JavaScript, for example. Further, it is not necessary that a single type of instruction or programming language be utilized in conjunction with the operation of the system and method of the invention. Rather, any number of different programming languages may be utilized as is necessary or desirable. As noted, the programming 1020 and/or device settings may be reconfigurable using an interface 920. For example, the interface 920 may be a wireless tablet that enters the network 910 as a node and can communicate with any designated device—e.g., as in a LAN by broadcasting packets over the entire network 910 but designating a particular device as the proper recipient. A device 915 may enforce user privilege levels via an interface 920, e.g., allowing users with supervisory privileges to change programming or device settings, and allowing other users merely to query the state of the device.

In general, the operation of a conventional network is conceptually simpler than that of a mesh network, although the degree of responsibility placed on the network controller 925 makes it an essential component. The network controller manages the overall organization of and communications over the network 910, including the entry and exit of nodes from the network, their respective priorities, and communications to, from and among nodes; for example, external communication with a particular device 915 may occur via the network controller 925 rather than directly, and similarly, communications between devices 915 may occur via the network controller 925. The database 940 maintained by the network controller 925 contains state information for all network-connected devices 915, and its contents are updated periodically by polling, by the network controller 925, of the connected devices 915. In other words, in a conventional network, there may be a single repository of device information rather than one maintained in whole or in part on the various devices 915. An operator may obtain information about a device by communication with a webserver of the network controller 925 via a remote browser 930—i.e., without actually entering the network via an interface device. (Of course, even in a mesh network, it is possible to equip individual devices with webservers to facilitate communication with the devices via the Internet rather than over the network 910.) In addition, the operator may send commands to a designated device 915 (e.g., to adjust or reprogram it) via the network controller 925.

As shown in FIG. 9B, one or more sensors 950 may be connected to the network. For example, ambient temperature sensors may be located in the various spaces where lighting modules 915 are deployed. The outputs of these sensors may be analyzed by the master device 915c or the network controller 925 to determine whether operational adjustments should be made to the devices 915 (e.g., the power supplied to the light sources) in response to a change in temperature, or whether an alarm should be issued if the temperature has risen above or fallen below the safe operating range. Alternatively or in addition, the sensor(s) 950 may include an occupancy sensor and/or an ambient-light-level sensor. Such sensors, as known to those of skill in the art, detect motion of and/or heat from occupants of the room in which the lighting module 915 is installed, and/or the level of ambient light in the room. Signals from these sensors may be used, for example, to turn off one or more lighting modules 915 when the illuminated space has been unoccupied for a threshold period of time, and reactivate the lighting module(s) once someone re-enters the space; and to reduce the light output of one or more lighting modules 915 in response to increasing levels of daylight entering through a window.

It should be noted that embodiments of the present invention may be provided as one or more computer-readable programs embodied on or in one or more articles of manufacture. The article of manufacture may be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. The software programs may be further translated into machine language or virtual machine instructions and stored in a program file in that form. The program file may then be stored on or in one or more of the articles of manufacture.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A lighting apparatus configured for internal communication over an internal network and communication with other lighting modules over an external network,
the apparatus comprising:
a power supply;
a controller;
a plurality of light sources;
an internal network facilitating bidirectional communication between the controller and the plurality of light sources; and
a transceiver for communicating over the external network,
wherein the controller is configured to:
communicate over the internal network with the at least one of the light sources to obtain state information therefrom,
communicate the state information over the external network using the using the transceiver,
receive, over the external network via the transceiver, a query pertaining to a designated one of the light sources,
responsively send a message to the designated light source over the internal network,
receive a response from the designated light source over the internal network, and answer the query by sending a message over the external network using the transceiver.

2. The apparatus of claim 1, wherein the apparatus comprises a plurality of light sources and the controller is configured to selectively communicate with any of the light sources over the internal network to obtain state information therefrom.

3. The apparatus of claim 1, wherein the internal network comprises a power bus for both powering the at least one light source and facilitating communication between the controller and the at least one light source.

4. The apparatus of claim 3, further comprising an impedance-switching circuit for selecting between a low power-supply output impedance and a high power-supply output impedance, wherein the at least one light source and the controller communicate over the power bus using the impedance-switching circuit to send messages to each other.

5. The apparatus of claim 1, wherein the controller is further configured to detect an anomalous operating condition by communicating with the at least one light source over the internal network.

6. The apparatus of claim 5, wherein the controller is further configured to (i) receive, over the external network via the transceiver, a query relating to an operating condition of the at least one light source and (ii) transmit, over the external network using the transceiver, a responsive message based on whether an anomalous condition has been detected.

7. The apparatus of claim 5, wherein the controller is further configured to send, over the external network via the transceiver, a message specifying an anomalous operating condition upon detection thereof.

8. The apparatus of claim 1, further comprising a database for storing external network information, the controller being configured to (i) receive, over the external network, a message intended for a device connected to the external network, (ii) use the database to determine a next hop for the message, and (iii) use the transceiver to transmit the message to a device corresponding to the next hop.

9. The apparatus of claim 1, further comprising a database for storing the state information, wherein the apparatus is configured to (i) operate in a slave mode if a master device is detected on the external network via the transceiver, (ii) operate the apparatus in a master mode if designated as the master device on the external network, and further wherein, when operating in the master mode, the controller is configured to communicate with other devices on the external network and obtain state information therefrom, and to maintain the state information in the database.

10. The apparatus of claim 9, wherein, in the master mode, the database stores state information from a plurality of devices connected to the external network, the controller being responsive to queries, received over the external network via the transceiver, involving (i) state information aggregated over at least some of the plurality of devices connected to the external network or (ii) state information for a designated device connected to the external network.

11. The apparatus of claim 9 wherein, in the master mode, the controller is configured to issue an alarm signal over the external network if an anomalous operating condition is detected from the state information.

12. The apparatus of claim 9 wherein, in the master mode, the controller is configured to detect and communicate with, via the transceiver, an interface device connected to the external network.

13. The apparatus of claim 1 further comprising a sensor for obtaining environmental information, the controller being further configured to (i) receive, over the external network via the transceiver, a query relating to the environmental information and (ii) transmit, over the external network using the transceiver, a responsive message based on readings from the sensor.

14. A system comprising a plurality of lighting modules configured for communication over an external network, the system comprising:
a plurality of lighting modules each comprising a power supply, a controller, a plurality of light sources, an internal network facilitating bidirectional communication between the controller and at least one of the light sources, and a transceiver for communicating over the external network, wherein the controller is configured to:
communicate over the internal network with the at least one of the light sources to obtain state information therefrom, communicate the state information over the external network using the using the transceiver,
receive, over the external network via the transceiver, a query pertaining to a designated one of the light sources,
responsively send a message to the designated light source over the internal network,
receive a response from the designated light source over the internal network, and
answer the query by sending a message over the external network using the transceiver.

15. The system of claim 14, wherein each of the devices comprises a database for storing state information and is configured (i) to operate in a slave mode if a master device is detected on the external network via the transceiver and (ii) to operate in a master mode if designated as the master device on the external network, and when operating in the master mode, to communicate with other devices on the external network and obtain state information therefrom, and maintain the state information in the database.

16. The system of claim 14, further comprising a network controller for individually communicating with the devices over the external network.

17. A method of communication among a plurality of lighting devices over an external network, the method comprising the steps of:
communicating over an internal network, by a controller within a first one of the devices, with at least one light source within the first device to obtain state information therefrom,
communicating the state information over the external network,
receiving, over the external network via the transceiver, a query pertaining to a designated one of a plurality of light sources,
responsively sending a message to the designated light source over the internal network,
receiving a response from the designated light source over the internal network, and
answering the query by sending a message over the external network using the transceiver.

18. The method of claim 17, wherein the first one of the devices comprises a plurality of light sources therein, the step of communicating over an internal network comprising selectively communicating with any of the light sources to obtain state information therefrom.

19. The method of claim 17, wherein the step of communicating over an internal network occurs over a power bus connected to the at least one light source.

20. The method of claim 19, wherein the step of communicating over an internal network occurs via impedance switching.

21. The method of claim 19, further comprising detecting an anomalous operating condition by communicating with the at least one light source over the power bus.

22. The method of claim 21, further comprising:
receiving, over the external network, a query relating to an operating condition of the at least one light source; and
transmitting, over the external network, a responsive message based on whether an anomalous operating condition has been detected.

23. The method of claim 22, further comprising the step of sending, over the external network, a message specifying an anomalous operating condition upon detection thereof.

24. The method of claim 17, further comprising the steps of:
storing external network information;
receiving, over the external network, a message intended for a device connected to the network;
using the stored external network information to determine a next hop for the message; and
transmitting the message to a device corresponding to the next hop.

25. The method of claim 17, further comprising the steps of:
storing operating information;
operating in a slave mode if a master device is detected on the external network;
operating apparatus in a master mode if designated as a master, and when operating in the master mode, (i) communicating with devices on the external network, (ii) obtaining operating information therefrom, and (iii) storing the obtained operating information.

26. The method of claim 25, further comprising the steps of, in the master mode:
storing operating information from a plurality of devices connected to the network; and
responding to queries, received over the external network, involving (i) operating information aggregated over at least some of the plurality of devices connected to the external network or (ii) operating information for a designated device connected to the external network.

27. The method of claim 25, further comprising the steps of, in the master mode, issuing an alarm signal over the external network if an anomalous condition is detected from the operating information.

28. The method of claim 25, further comprising the steps of, in the master mode, communicating with an interface device connected to the external network.

29. The method of claim 17, further comprising the steps of:
obtaining environmental information;
receiving, over the external network, a query relating to the environmental information; and
transmitting, over the external network, a responsive message.

* * * * *